(12) United States Patent
Bakke et al.

(10) Patent No.: US 9,940,249 B2
(45) Date of Patent: *Apr. 10, 2018

(54) IMPLEMENTING HARDWARE ACCELERATOR FOR STORAGE WRITE CACHE MANAGEMENT WITH CACHE LINE MANIPULATION

(71) Applicant: International Business Machines Corporation, Armonk, NY (US)

(72) Inventors: Brian E. Bakke, Rochester, MN (US); Joseph R. Edwards, Rochester, MN (US); Robert E. Galbraith, Rochester, MN (US); Adrian C. Gerhard, Rochester, MN (US); Daniel F. Moertl, Rochester, MN (US); Gowrisankar Radhakrishnan, Colorado Springs, CO (US); Rick A. Weckwerth, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/939,516

(22) Filed: Nov. 12, 2015

(65) Prior Publication Data

US 2017/0131909 A1    May 11, 2017

Related U.S. Application Data

(60) Provisional application No. 62/252,749, filed on Nov. 9, 2015.

(51) Int. Cl.
*G06F 12/0895* (2016.01)
*G06F 12/122* (2016.01)
(Continued)

(52) U.S. Cl.
CPC ...... *G06F 12/0895* (2013.01); *G06F 12/0868* (2013.01); *G06F 12/0891* (2013.01);
(Continued)

(58) Field of Classification Search
CPC .................................. G06F 12/0866–12/0873
See application file for complete search history.

(56) References Cited

U.S. PATENT DOCUMENTS 5,542,066 A     7/1996  Matterson et al.
5,581,737 A *  12/1996  Dahlen ................ G06F 12/023
                                                         707/999.101
(Continued)

FOREIGN PATENT DOCUMENTS

EP          0258559 A2 *  3/1988  ........... G06F 12/084

OTHER PUBLICATIONS

Intel. "An Overview of Cache." 2002. http://download.intel.com/design/intarch/papers/cache6.pdf.*
(Continued)

*Primary Examiner* — Nathan Sadler
(74) *Attorney, Agent, or Firm* — Joan Pennington

(57) ABSTRACT

A method and controller for implementing storage adapter enhanced write cache management, and a design structure on which the subject controller circuit resides are provided. The controller includes a hardware write cache engine implementing hardware acceleration for storage write cache management. The hardware write cache engine performs hardware manipulation of CLs (Cache Lines), a hash table, and per array LRU queues.

15 Claims, 34 Drawing Sheets

(51) Int. Cl.
*G06F 12/0868* (2016.01)
*G06F 12/0891* (2016.01)
*G06F 12/0893* (2016.01)
*G06F 13/40* (2006.01)
*G06F 13/42* (2006.01)
*G06F 13/28* (2006.01)

(52) U.S. Cl.
CPC ........ *G06F 12/0893* (2013.01); *G06F 12/122* (2013.01); *G06F 13/28* (2013.01); *G06F 13/4022* (2013.01); *G06F 13/4282* (2013.01); *G06F 2212/222* (2013.01); *G06F 2212/604* (2013.01); *G06F 2212/6042* (2013.01)

(56) References Cited

U.S. PATENT DOCUMENTS

| | | | | |
|---|---|---|---|---|
| 6,119,209 | A * | 9/2000 | Bauman | G06F 12/0895 711/118 |
| 6,134,624 | A * | 10/2000 | Burns | G06F 12/084 710/316 |
| 6,192,450 | B1 * | 2/2001 | Bauman | G06F 12/0804 711/133 |
| 6,574,709 | B1 * | 6/2003 | Skazinski | G06F 11/2092 711/119 |
| 6,728,818 | B2 | 4/2004 | Bakke et al. | |
| 6,839,827 | B1 * | 1/2005 | Beardsley | G06F 3/0605 711/114 |
| 6,857,045 | B2 | 2/2005 | Galbraith et al. | |
| 7,010,645 | B2 | 3/2006 | Hetzler et al. | |
| 7,275,134 | B2 | 9/2007 | Coulson | |
| 7,275,135 | B2 | 9/2007 | Coulson | |
| 7,360,021 | B2 | 4/2008 | Arimilli et al. | |
| 7,725,661 | B2 | 5/2010 | Liu et al. | |
| 7,979,655 | B2 | 7/2011 | Edwards et al. | |
| 8,667,219 | B2 | 3/2014 | Eleftheriou et al. | |
| 8,856,479 | B2 | 10/2014 | Gerhard et al. | |
| 8,868,828 | B2 | 10/2014 | Bakke et al. | |
| 8,886,881 | B2 | 11/2014 | Bakke et al. | |
| 2005/0144510 | A1 * | 6/2005 | Zayas | G06F 12/0866 714/5.1 |
| 2006/0265568 | A1 * | 11/2006 | Burton | G06F 12/0862 711/216 |
| 2007/0028136 | A1 | 2/2007 | Forhan et al. | |
| 2007/0250660 | A1 * | 10/2007 | Gill | G06F 12/0804 711/103 |
| 2007/0266027 | A1 * | 11/2007 | Gattegno | G06F 3/0605 |
| 2012/0079212 | A1 * | 3/2012 | Dantzig | G06F 12/0842 711/144 |
| 2012/0303859 | A1 * | 11/2012 | Bakke | G06F 11/1076 711/102 |
| 2013/0019063 | A1 * | 1/2013 | Astigarraga | G06F 12/126 711/125 |
| 2015/0046648 | A1 | 2/2015 | Anderson et al. | |
| 2015/0058576 | A1 | 2/2015 | Galbraith et al. | |
| 2016/0188223 | A1 * | 6/2016 | Camp | G06F 3/0613 711/103 |

OTHER PUBLICATIONS

Filipa Duarte. A Cache-Based Hardware Accellerator for Memory Data Movements. Oct. 2008. Delft University of Technology. Thesis.*
Appendix P—List of IBM Patents or Patent Applications Treated as Related—Jan. 13, 2016.
"Implementing Hardware Accelerator for Storage Write Cache Management", Bakke et al., U.S. Appl. No. 14/939,254, filed Nov. 12, 2015.
"Implementing Hardware Accelerator for Storage Write Cache Management for Writes to Storage Write Cache", Bakke et al., U.S. Appl. No. 14/939,589, filed Nov. 12, 2015.
"Implementing Hardware Accelerator for Storage Write Cache Management for Reads From Storage Write Cache", Bakke et al., U.S. Appl. No. 14/939,649, filed Nov. 12, 2015.
"Implementing Hardware Accelerator for Storage Write Cache Management for Reads With Partial Read Hits From Storage Write Cache", Bakke et al., U.S. Appl. No. 14/939,762, filed Nov. 12, 2015.
"Implementing Hardware Accelerator for Storage Write Cache Management for Destage Operations From Storage Write Cache", Bakke et al., U.S. Appl. No. 14/939,838, filed Nov. 12, 2015.
"Implementing Hardware Accelerator for Storage Write Cache Management for Simultaneous Read and Destage Operations From Storage Write Cache", Bakke et al., U.S. Appl. No. 14/939,917, filed Nov. 12, 2015.
"Implementing Hardware Accelerator for Storage Write Cache Management for Identification of Data Age in Storage Write Cache", Bakke et al., U.S. Appl. No. 14/939,961, filed Nov. 12, 2015.
"Implementing Hardware Accelerator for Storage Write Cache Management for Managing Cache Line Updates for Writes, Reads, and Destages in Storage Write Cache", Bakke et al., U.S. Appl. No. 14/939,990, filed Nov. 12, 2015.
"Implementing Hardware Accelerator for Storage Write Cache Management for Managing Cache Lines Updates for Purges From Storage Write Cache", Bakke et al., U.S. Appl. No. 14/940,021, filed Nov. 12, 2015.
"Implementing Hardware Accelerator for Storage Write Cache Management for Managing Cache Destage Rates and Thresholds for Storage Write Cache", Bakke et al., U.S. Appl. No. 14/940,035, filed Nov. 12, 2015.
"Implementing Hardware Accelerator for Storage Write Cache Management for Managing Data Merge on Fast Writes to Storage Write Cache", Bakke et al., U.S. Appl. No. 14/940,050, filed Nov. 12, 2015.

* cited by examiner

CACHE LINE (CL) IN CONTROL STORE (CS)
600

| BYTE 0 | BYTE 1 | BYTE 2 | BYTE 3 | BYTE 4 | BYTE 5 | BYTE 6 | BYTE 7 |
|---|---|---|---|---|---|---|---|
| ARRAY ID | MASK | (40:0=1PB, 44:0=16PB) 6B ARRAYOFFSET, ALWAYS 5XX UNITS (LOWER 3BITS-0) | | | | | |
| STATE | OP BUILD NUMBER | | | | | | |
| CS ADDRESS UP (PREV) POINTER FOR LRU (LOWER 6 BITS=0) | | | | CS ADDRESS DOWN (NEXT) POINTER FOR LRU (LOWER 6 BITS=0) | | | |
| CS ADDRESS PREVIOUS POINT FOR HASH (LOWER 6 BITS=0) | | | | CS ADDRESS NEXT POINTER FOR HASH (LOWER BITS=0) | | | |
| COMPRESSION INDEX0 OR ZERO | | | | COMPRESSION INDEX1 OR ZERO | | | |
| COMPRESSION INDEX2 OR ZERO | | | | COMPRESSION INDEX3 OR ZERO | | | |
| COMPRESSION INDEX4 OR ZERO | | | | COMPRESSION INDEX5 OR ZERO | | | |
| COMPRESSION INDEX6 OR ZERO | | | | COMPRESSION INDEX7 OR ZERO | | | |

FIG. 6

CACHE LINE (CL) IN CONTROL STORE (CS)
BUILT FOR AUTO MIRROR
700

| ARRAY ID | MASK | 6B ARRAYOFFSET, ALWAYS 5XX UNITS (LOWER 3BITS-0) | |
|---|---|---|---|
| 0X80 OR C0 | OP BUILD NUMBER | | |
| ZERO | | ZERO | |
| ZERO | | ZERO | |
| COMPRESSION INDEX0 OR ZERO | | COMPRESSION INDEX1 OR ZERO | |
| COMPRESSION INDEX2 OR ZERO | | COMPRESSION INDEX3 OR ZERO | |
| COMPRESSION INDEX4 OR ZERO | | COMPRESSION INDEX5 OR ZERO | |
| COMPRESSION INDEX6 OR ZERO | | COMPRESSION INDEX7 OR ZERO | |

FIG. 7

CACHE LINE (CL) IN DATA STORE (DS)
800

(THE CL IN DS 800 HAS THE MINIMAL INFORMATION NEEDED TO IDENTIFY THAT THE CL IS VALID (i.e. ALLOCATED), WHAT ARRAY ID AND LBA THE DATA IS FOR, THE OP BUILD NUMBER, AND THE COMPRESSION RELATED INFORMATION)

| ARRAY ID | MASK | 6B ARRAYOFFSET, ALWAYS 5XX UNITS (LOWER 3BITS-0) |
|---|---|---|
| 0X80 | OP BUILD NUMBER ||
| ZERO || ZERO |
| ZERO || ZERO |
| COMPRESSION INDEX0 OR ZERO || COMPRESSION INDEX1 OR ZERO |
| COMPRESSION INDEX2 OR ZERO || COMPRESSION INDEX3 OR ZERO |
| COMPRESSION INDEX4 OR ZERO || COMPRESSION INDEX5 OR ZERO |
| COMPRESSION INDEX6 OR ZERO || COMPRESSION INDEX7 OR ZERO |

INSTALL: LOOP THIS CB TO WQ IF 1B FINDS MIP/RIP/DIP/OIP SET 1022

| | |
|---|---|
| 1A | READ PAGE LIST, EACH CL TURN ON MIP & HASHV ADD TO LRU & HASH |
| 1B | SEARCH NEXT CL IN HASH FOR SAME ARRAYID & ARRAYOFFSET, EACH CL FOUND TURN ON OIP REMOVE FROM LRU, PUT SAS DELETE CL MIRROR PAGE LIST |

TURN OFF MIP & OIP 1024

| | |
|---|---|
| 2A | READ PAGE LIST, EACH CL TURN OFF MIP 2A |
| 2B | READ NEXT CL IF OIP SET AND SAME ARRAYID & ARRAYOFFSET, EACH CL FOUND TURN OFF OIP, TURN OFF HASHV, REMOVE FROM HASH PUT ON DEALLOCATE PAGE LIST |

UNDO INSTALL 1026

| | |
|---|---|
| 3A | READ PAGE LIST, EACH CL TURN OFF MIP, TURN OFF HASHV, REMOVE FROM HASH AND LRU |
| 3B | READ NEXT CL IF OIP SET AND SAME ARRAY ID & ARRAY OFFSET, EACH CL FOUND TURN OFF OIP, TURN OFF PURGE, ADD BACK INTO LRU |

READ SEARCH LOOP THIS CB TO WQ IF "4" FINDS MIP/RIP/OIP 1028

| | |
|---|---|
| 4 | SEARCH HASH FOR MATCHING ARRAYID & ARRAYOFFSET, EACH CL FOUND TURN ON RIP, PUT ON COMBO HDMA2h PAGE LIST, OTHERWISE WRITE VOL INDEX TO COMBO PAGE LIST |

TURN OFF RIP READ COMBO PAGE LIST, USE SKIP MASK 1030

| | |
|---|---|
| 5A | EACH CL FOUND WITH HASHV ON, TURN OFF RIP |
| 5B | EACH CL FOUND WITH HASHV OFF, TURN OFF RIP, PUT ON DEALLOCATE PAGE LIST |

DESTAGE, IGNORE DIP/MIP/OIP 1032

| | |
|---|---|
| 6 | SEARCH HASH FOR A 256KB RANGE OF ARRAY OFFSET, EACH CL FOUND TURN ON DIP, REMOVE FROM LRU, PUT ON PAGE LIST |

TURN OFF DIP, READ PAGE LIST 1034

| | |
|---|---|
| 7A | EACH CL FOUND WITH RIP OFF, TURN OFF DIP, TURN OFF HASHV, REMOVE FROM HASH, PUT ON DEALLOCATE PAGE LIST |
| 7B | EACH CL FOUND WITH RIP ON, TURN OFF DIP, TURN OFF HASHV, REMOVE FROM HASH |

UNDO DESTAGE 1036

| | |
|---|---|
| 8 | READ PAGE LIST, TURN OFF DIP, TURN OFF PURGE STATUS, ADD BACK TO LRU |

PURGE, IGNORE MIP OR ALLOCATE=0 OR 4:0=0 OR IF PURGE STATUS=1 1038

| | |
|---|---|
| 9A | EACH CL FOUND WITH OIP/DIP OFF AND HASHV ON, TURN ON PURGE STATUS, TURN ON DIP, REMOVE FROM LRU, PUT ON DEALLOCATE PAGE LIST |
| 9B | EACH CL FOUND WITH OIP/DIP ON OR HASHV OFF, TURN ON PURGE STATUS |

1400

| BUFFER A (MIP, NEW DATA) 1402 | BUFFER B OIP, OLD DATA) 1404 | BUFFER A (MIP, MERGED DATA) 1406 |
|---|---|---|
|  | OLD DATA, LBA=0X1000 | OLD DATA, LBA=0X1000 |
|  | OLD DATA, LBA=0X1001 | OLD DATA, LBA=0X1001 |
|  | OLD DATA, LBA=0X1002 | OLD DATA, LBA=0X1002 |
|  | OLD DATA, LBA=0X1003 | OLD DATA, LBA=0X1003 |
| NEW DATA, LBA=0X1004 | OLD DATA, LBA=0X1004 | NEW DATA, LBA=0X1004 |
| NEW DATA, LBA=0X1005 | OLD DATA, LBA=0X1005 | NEW DATA, LBA=0X1005 |
| NEW DATA, LBA=0X1006 | OLD DATA, LBA=0X1006 | NEW DATA, LBA=0X1006 |
| NEW DATA, LBA=0X1007 | OLD DATA, LBA=0X1007 | NEW DATA, LBA=0X1007 |
| NEW DATA, LBA=0X1008 | OLD DATA, LBA=0X1008 | NEW DATA, LBA=0X1008 |
| NEW DATA, LBA=0X1009 | OLD DATA, LBA=0X1009 | NEW DATA, LBA=0X1009 |
| NEW DATA, LBA=0X100A | OLD DATA, LBA=0X100A | NEW DATA, LBA=0X100A |
| NEW DATA, LBA=0X100B | OLD DATA, LBA=0X100B | NEW DATA, LBA=0X100B |
| NEW DATA, LBA=0X100C | OLD DATA, LBA=0X100C | NEW DATA, LBA=0X100C |
| NEW DATA, LBA=0X100D | OLD DATA, LBA=0X100D | NEW DATA, LBA=0X100D |
| NEW DATA, LBA=0X100E | OLD DATA, LBA=0X100E | NEW DATA, LBA=0X100E |
| NEW DATA, LBA=0X100F | OLD DATA, LBA=0X100F | NEW DATA, LBA=0X100F |
| NEW DATA, LBA=0X1010 | OLD DATA, LBA=0X1010 | NEW DATA, LBA=0X1010 |
| NEW DATA, LBA=0X1011 | OLD DATA, LBA=0X1011 | NEW DATA, LBA=0X1011 |
|  | OLD DATA, LBA=0X1012 | OLD DATA, LBA=0X1012 |

FIG. 14

REGISTER BASED PURGE HW ASSIST TOOL KIT 2000

| WC HARDWARE READS ALL THE CLS, ANY THAT MATCH THIS RANGE WILL HAVE THE FOLLOWING OCCUR:<br>IF ALLOCATE=1, PIP=0, MIP=0 AND HASHV=1 THEN TURN ON PIP AND INCREMENT COUNTER.<br>IF INCREMENTED COUNTER, DIP=0 AND OIP=0 THEN TURN ON DIP, REMOVE FROM LRU AND PUT CL ON THE PAGE TABLE LIST.<br>WC ENGINE CAN PROCESS CB DURING THIS TIME, THIS FUNCTION WILL INTERLEAVE WITH CB PROCESSING 2002 |
|---|

| FW LOADED REGISTERS 2004 | CL 2026 |
|---|---|
| ARRAY ID(7:0) 2006 | PIP( PURGE IN PROGRESS) BIT 2028 (INCREMENT PURGE PENDING COUNT WHEN SET, DECREMENT PURGE PENDING COUNT ON DEALLOCATE) |
| STARTING ARRAY OFFSET(44:0), BITS(2:0)=0 SINCE MUST BE 4KB ALIGNED 2008 | |
| ENDING ARRAY OFFSET SIZE(44:0), BITS(2:0)=0 SINCE MUST BE 4KB MULTIPLE 2010 | |
| PAGE TABLE LIST POINTER(31:0) 2012 | EVENT Q ENTRIES 2030 |
| PAGE TABLE SIZE(11:0), UP TO 4K-1 ENTRIES 2014 | THE ABOVE PAUSES WHEN THE PAGE TABLE LIST IS FULL AND SEND A PURGE PAGE LIST EVENTQ ENTRY 2032 |
| PAGE TABLE CURRENT SIZE(11:0) 2016 | WHEN PURGE FINISHES A SWEEP AND THE PAGE LIST IS NOT EMPTY THEN SEND A PURGE PAGE LIST EVENTQ ENTRY 2034 |
| CURRENT CL INDEX(24:0) 2018 (MAY BE SET TO ZERO AT START, HELD AFTER A PAUSE) | |
| MAX CL INDEX(24:0) 2020 | AFTER BOTH THE PURGE FINISHES AND THE COUNTER IS ZERO THEN SEND A PURGE DONE EVENTQ ENTRY 2036 |
| ACTIVE BIT, PAGE TABLE INTERRUPT BIT 2022 | |
| CURRENT PURGE COUNTER(24:0), DEALLOCATE WILL DECREMENT FOR ANY CL WITH PIP BIT SET 2024 | |

FIG. 20

HW COUNTER AND STATISTICS 2300

| |
|---|
| CURRENT COUNTER VALUE CL 2302 |
| CURRENT COUNTER VALUE LOCALITY BIT 2304 |
| HWM CL 2406 |
| HWM LOCALITY BIT 2308 |
| LWM CL 2310 |
| LWM LOCALITY BIT 2312 |
| LRU UP, OLDEST CL ENTRY ON THE LRU, ZERO=NULL 2314 |
| LRU DOWN, NEXT LOCATION A NEW CL WILL BE PLACED, ZERO=NULL 2316 |
| CURRENT COUNTER VALUE WC INSTALLS TOTAL 2318 |
| CURRENT COUNTER VALUE WC INSTALLS WITH OVERLAY 2320 |
| CURRENT COUNTER VALUE WC READS TOTAL 2322 |
| CURRENT COUNTER VALUE WC READS WITH FULL CACHE READ HITS 2324 |

FIG. 23

IMPLEMENTING HARDWARE ACCELERATOR FOR STORAGE WRITE CACHE MANAGEMENT WITH CACHE LINE MANIPULATION

FIELD OF THE INVENTION

The present invention relates generally to the data processing field, and more particularly, relates to a method and controller for implementing enhanced storage write cache management, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

Storage adapters and storage subsystems often contain a write cache to enhance performance. The write cache is typically non-volatile, for example, using Flash backed DRAM and is used to mask the write penalty introduced by redundant arrays of independent disks (RAID), such as RAID-5 and RAID-6. A write cache can also improve storage performance by coalescing multiple host operations placed in the write cache into a single destage operation which is then processed by the RAID layer and disk devices. For redundancy, the write cache data and directory or metadata can be mirrored to a second or dual adapter which advantageously is utilized in the case of an adapter failure.

In a fully associative or other complex cache used in a storage subsystem to cache user or host data, many CPU cycles typically are required to update the needed metadata to put data into write cache. This metadata includes Cache Line (CL) structures, a hash table for fast searching, and a Least Recently Used (LRU) queue for finding the oldest data. The metadata is used for maintaining coherency, keeping the cache directory non-volatile, and to enable finding data to remove from cache.

A need exists for an effective method and controller for implementing enhanced storage write cache management. A need exists to provide such method and controller that provides a hardware accelerated design including a hardware write cache engine which manages the write cache data and metadata with a minimum of, or no, firmware involvement to greatly enhance performance.

As used in the following description and claims, the terms controller and controller circuit should be broadly understood to include an input/output (IO) adapter (IOA) and includes an IO RAID adapter connecting various arrangements of a host computer system and peripheral storage I/O devices including hard disk drives, solid state drives, tape drives, compact disk drives, and the like.

As used in the following description and claims, the terms: substantially without using firmware, with minimal, minimum of, or no firmware involvement, should be broadly understood to include operations and functions performed by hardware and may include operation or control being passed from or to firmware.

SUMMARY OF THE INVENTION

Principal aspects of the present invention are to provide a method and a controller for implementing storage adapter enhanced write cache management, and a design structure on which the subject controller circuit resides. Other important aspects of the present invention are to provide such method, controller, and design structure substantially without negative effects and that overcome many of the disadvantages of prior art arrangements.

In brief, a method and controller for implementing storage adapter enhanced write cache management, and a design structure on which the subject controller circuit resides are provided. The controller includes a hardware write cache engine implementing hardware acceleration for storage write cache management. The hardware write cache engine performs hardware manipulation of CLs (Cache Lines), a hash table, and per array LRU queues.

BRIEF DESCRIPTION OF THE DRAWINGS

The present invention together with the above and other objects and advantages may best be understood from the following detailed description of the preferred embodiments of the invention illustrated in the drawings, wherein:

FIG. 6 illustrates an example cache line (CL) structure in control store (CS) included with the controller for implementing storage adapter enhanced write cache management in accordance with the preferred embodiment;

FIG. 7 illustrates an example cache line (CL) structure in control store (CS) for auto minor to data store (DS) included with the controller for implementing storage adapter enhanced write cache management in accordance with the preferred embodiment;

FIG. 8 illustrates an example cache line (CL) structure in data store (DS) included with the controller for implementing storage adapter enhanced write cache management in accordance with the preferred embodiment;

FIGS. 10A and 10B illustrates example transactions in cache line (CL) states in hardware included with the controller for implementing storage adapter enhanced write cache management in accordance with the preferred embodiment;

FIG. 14 illustrates an example XOR merge on fast write with overlay included with the controller for implementing storage adapter enhanced write cache management in accordance with the preferred embodiment;

FIG. 20 illustrates example register based purge hardware assist tool kit included with the controller for implementing storage adapter enhanced write cache management in accordance with the preferred embodiment;

FIG. 23 illustrates example hardware counters and statistics included with the controller for implementing storage adapter enhanced write cache management in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller for implementing storage adapter enhanced write cache management, and a design structure on which the subject controller circuit resides are provided. The method and controller of the invention include a write cache hardware engine managing write cache and providing substantially atomic update of a cache directory. Both a write into and a read from write cache is performed using the write cache hardware engine without using firmware, chaining together hardware engines.

Figure 1A:
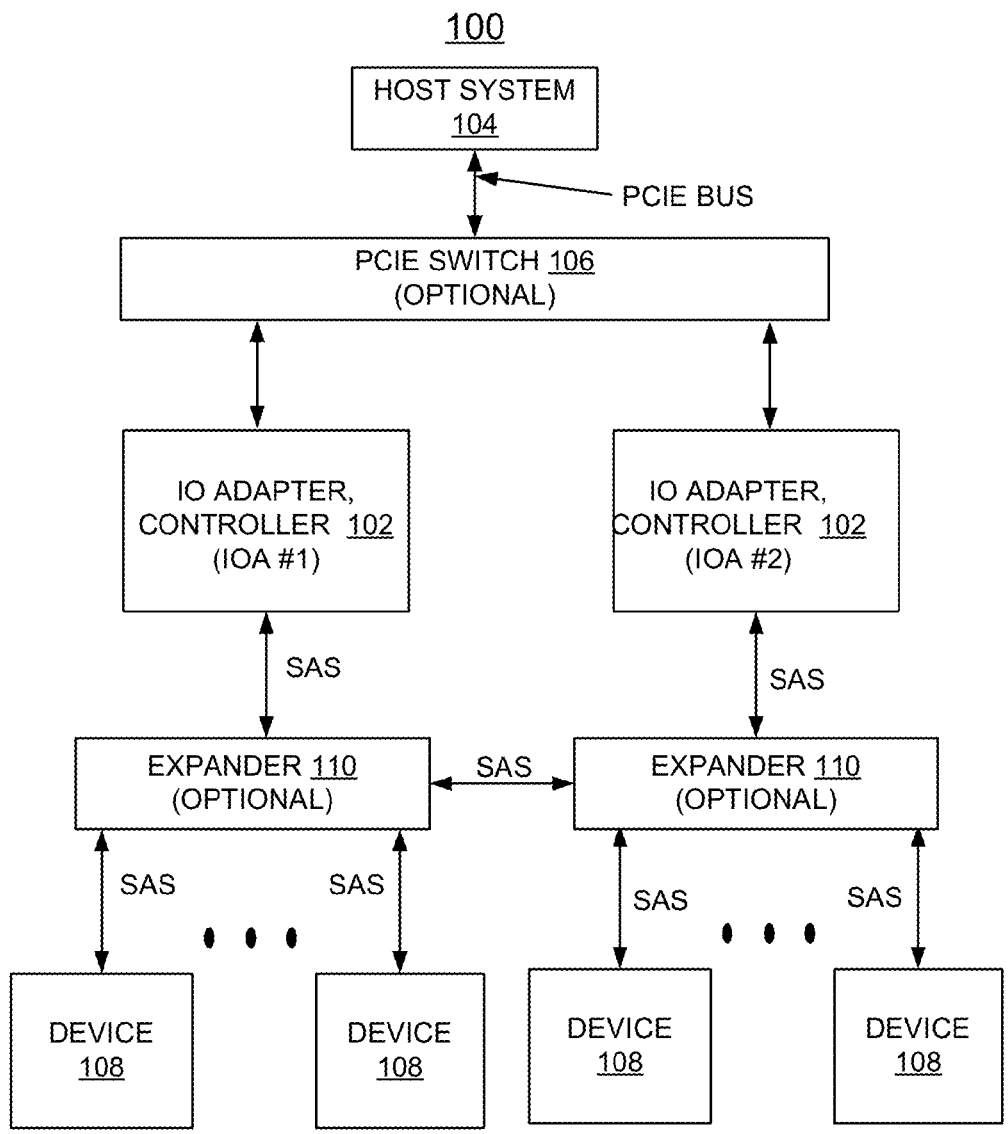
FIGS. 1A and 1B are a schematic and block diagrams respectively illustrating an example system with dual controllers and an input/output (IO) adapter for implementing storage adapter enhanced write cache management in accordance with the preferred embodiment.
Figure 1B:
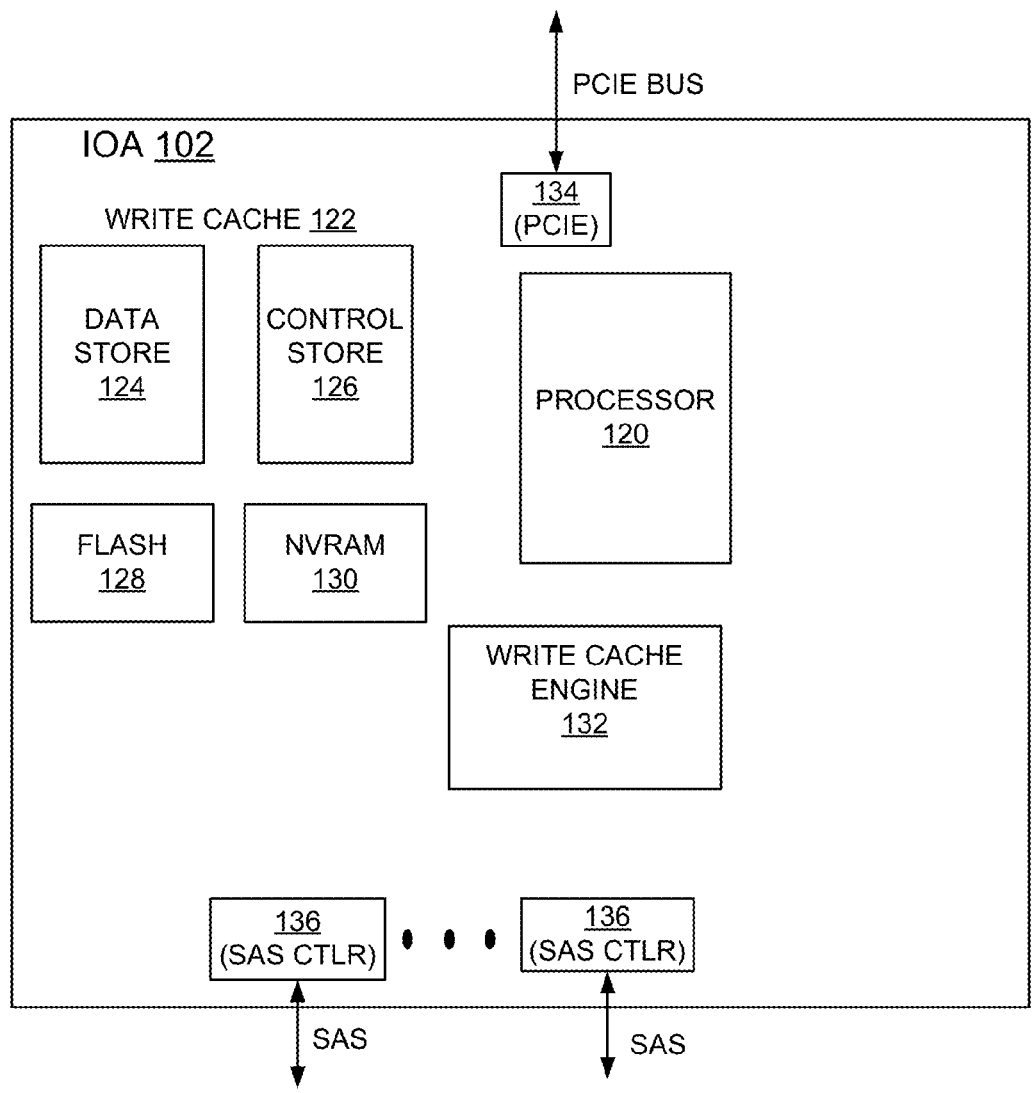

Having reference now to the drawings, FIGS. 1A and 1B respectively illustrate an example system generally designated by the reference character 100 with dual controllers and an input/output (IO) adapter generally designated by the reference character 102 for implementing storage adapter enhanced write cache management in accordance with preferred embodiments. System 100 includes a first input/output adapter (IOA) or controller 102, IOA #1 and a second input/output adapter (IOA) or controller 102, IOA #2 with write cache data and directory or metadata mirrored to the dual IOA, which can be utilized in the case of adapter failure. System 100 includes a host system 104, with the IOAs #1 and #2, controllers 102 directly coupled to the host system 104 via a Peripheral Component Interconnect Express (PCIE) bus or optionally coupled to the host system 104 via a PCIE switch 106. System 100 includes a plurality of storage devices 108, such as hard disk drives (HDDs) or spinning drives 108, and solid state drives (SSDs) 108 including for example, redundant array of independent drives (RAID) optionally coupled by a respective expander 110 to the IOAs #1 and #2, controllers 102 via one or more serial attached SCSI (SAS) connections with SAS connections between the IOAs #1 and #2, controllers 102.

In FIG. 1B, there are shown further example components of each of the IOAs #1 and #2, controllers 102 in the data storage system 100 in accordance with the preferred embodiments. Controller 102 includes one or more processors or central processor units (CPUs) 120, a write cache 122 including at least a data store (DS) 124, and a control store (CS) 126, such as a dynamic random access memory (DRAM). Controller 102 includes a flash memory 128, and a non-volatile random access memory (NVRAM) 130.

Controller 102 includes a write cache engine 132 in accordance with the preferred embodiments. Controller 102 includes a Peripheral Component Interconnect Express (PCIE) interface 134 connected via the PCIE bus to the host system and a Serial Attach SCSI control (SAS CTLR) 136 connected to each of a plurality of storage devices 108.

IOAs #1 and #2, controllers 102 and write cache engine 132, which includes a plurality of hardware engines, for example, for implementing a method of chaining together hardware engines, using no firmware, to perform a write or write-with-overlay into write cache; and for implementing a method of chaining together hardware engines, using no firmware, to perform a read from write cache.

In accordance with features of the invention, a method and controller 102 for implementing storage adapter enhanced write cache management including the write cache engine 132 generate a chain of operations, using different hardware engines, to perform a write or write-with-overlay into the write cache using no firmware. Controller 102 and write cache engine 132 implement the method by performing the steps of: allocating nonvolatile (NV) buffers, direct memory access (DMA) for DMAing data from host, determining if existing data in cache may have been overlaid while updating cache line (CL) states, merging non-4K data at the beginning and end of the write operation, DMAing data to a remote adapter while also updating CLs in local and remote NV memory, clearing CLs for overlaid data in the local and remote NV memory, final updates to the CL states, deallocating NV buffers for any overlaid data, and sending a response to the host command.

In accordance with features of the invention, a method and controller 102 for implementing storage adapter enhanced write cache management including the write cache engine 132 generating a chain of operations, using different hardware engines, to perform a read from the write cache using no firmware. Controller 102 and write cache engine 132 implement the method by performing the steps of: allocating Vol buffers, searching the write cache for a read hit, DMAing data to host, deallocating Vol buffers, final updates to the CL states, deallocating NV buffers for any data being read which was concurrently destaged from cache, and sending a response to the host command.

In accordance with features of the invention, a method and controller 102 for implementing storage adapter enhanced write cache management including the write cache engine 132 generating a chain of operations, using different hardware engines, to perform a partial read hit from the write cache using no firmware. Controller 102 and write cache engine 132 implement the method by performing the steps of: Allocating Vol buffers, searching the write cache for a read hit, reading/merging data from HDDs/SSDs for the partial read hits, DMAing data to host, deallocating Vol buffers, final updates to the CL states, deallocating NV buffers for any data being read which was concurrently destaged from cache, and sending a response to the host command.

In accordance with features of the invention, a method and controller 102 for implementing storage adapter enhanced write cache management including the write cache engine 132 generating a chain of operations, using different hardware engines, to perform a destage operation from the write cache using minimal firmware. Controller 102 and write cache engine 132 assist in generating the destage operation with options to start at either the LRU or a specified array LBA, and to stop at either a max requested size/span or the end of a 256K stripe boundary.

In accordance with features of the invention, a method and controller 102 for implementing storage adapter enhanced write cache management including the write cache engine 132 implementing a set of policies which allow for a host read and a cache destage to occur simultaneously for the same CLs. Collisions which do occur are queued and dispatched by the hardware.

In accordance with features of the invention, a method and controller 102 for implementing storage adapter enhanced write cache management including the write cache engine 132 that uses an Op Build Number or sequence number within a (CL) to enable guaranteed correct identification of older vs. newer data in cache for the same array logical block address (LBA).

In accordance with features of the invention, a method and controller 102 for implementing storage adapter enhanced write cache management including the write cache engine 132 implementing hardware Turn Offs for use in completing or undoing CLs updates for writes, reads, and destage operations.

In accordance with features of the invention, a method and controller 102 for implementing storage adapter enhanced write cache management including the write cache engine 132 that implements a unique hardware engine used to identify and update CLs for an array LBA range which are to be purged from the cache.

In accordance with features of the invention, a method and controller 102 for implementing storage adapter enhanced write cache management including the write cache engine 132 implementing an XOR (exclusive OR) merge function, for example, on fast write with overlay.

In accordance with features of the invention, a method and controller 102 for implementing storage adapter enhanced write cache management including the write cache engine 132 implementing a trigger based method to dynamically optimize cache destage rate and adjust the thresholding and limiting of data in cache for each array, using hardware provided inputs (registers) and outputs (registers and events) to assist firmware.

In accordance with features of the invention, a method and controller 102 for implementing storage adapter enhanced write cache management including the write cache engine 132 implementing a high level framework of the hardware accelerated design which manages the write cache data and metadata (directory) with a minimum of, or no, firmware involvement greatly enhancing performance.

In accordance with features of the invention, a method and controller 102 for implementing storage adapter enhanced write cache management including the write cache engine 132 provides hardware manipulation of CLs (Cache Lines), the hash table, and per array LRU queues. This is done in a pseudo atomic fashion such that updates to these structures are either left unmodified or are completely updated each time the hardware engine executes. All entries being modified, for example, are Checked-Out into a cache, changed one or more times, and then burst Checked-In if successful. Only the CLs are kept non-volatile and it is possible for a subset of the CLs to be modified when an adapter failure occurs.

In accordance with features of the invention, a method and controller 102 for implementing storage adapter enhanced write cache management including the write cache engine 132 that includes a CL definition which allows the following states to be tracked: Overlay In Progress (OIP), during a write with overlay operation; Read In Progress (RIP), during a read operation; and Destage In Progress (DIP), during a destage operation. RIP and DIP are allowed concurrently to minimize collisions, which is not possible in conventional designs.

In accordance with features of the invention, a method and controller 102 for implementing storage adapter enhanced write cache management including the write cache engine 132 implementing writes, non-optimized or provisional writes, reads and destage operations providing enhanced performance.

Figure 2A:
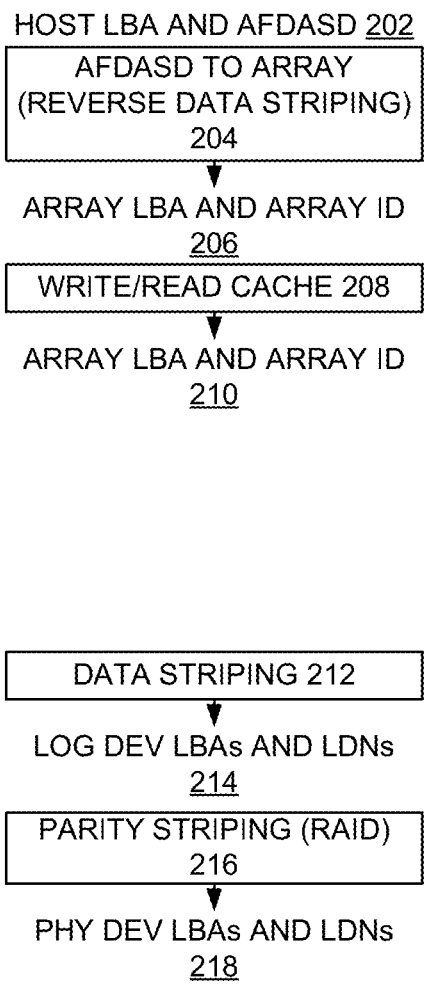
FIGS. 2A and 2B respectively illustrate an example logical block address (LBA) translation RAID stack included with the controller for implementing storage adapter enhanced write cache management of FIGS. 1A and 1B with write cache placed high in the RAID stack in FIG. 2A, above Dynamic Tier (Easy Tier), data striping, and parity striping (RAID) layers where caching is performed on an Array ID/Array LBA basis in accordance with the preferred embodiment.
Figure 2B:
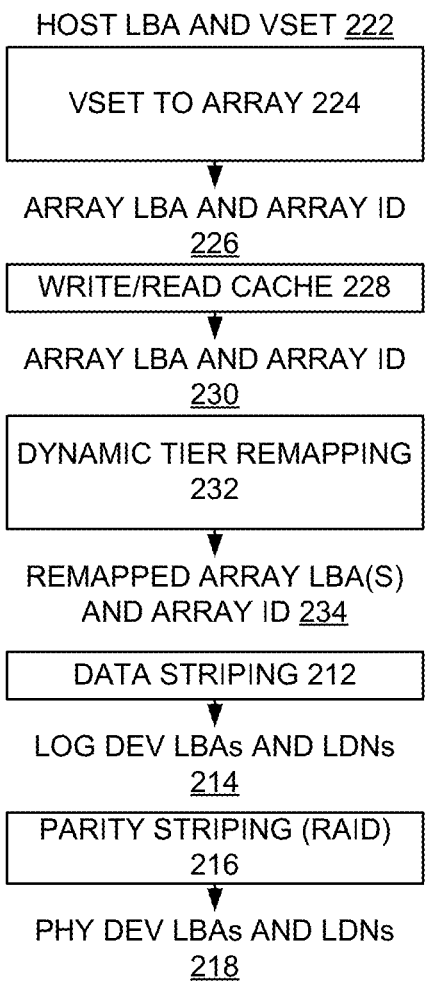

Referring now to FIGS. 2A and 2B, controller 102 implements an example logical block address (LBA) translation RAID stack generally designated by the reference character 200 as shown in FIG. 2A for implementing storage adapter enhanced write cache management. FIG. 2B illustrates host LBA translation with (VSet) Volume set (i.e. a logical device which can be read and written by the host) generally designated by the reference character 220.

In FIG. 2A, controller 102 implements host LBA and AFDASD (Advanced Function DASD) translation 202 that is used with the IBM® i operating system. AFDASD represents a RAID capable physical device which may be read and written by the IBM® i operating system. Host LBA and AFDASD translation 202 starts with AFDASD to array or reverse data striping at block 204 providing array LBA and array ID at 206 with read/write cache 208 providing array LBA and array ID at 210. Read/write cache 208 is placed high in the RAID stack 200, and above (RAID) layers data striping 212 providing logical device LBAs and LDNs (logical device numbers) 214, and parity striping 216, which provides physical device LBAs and LDNs 218 where caching is performed on an Array ID/Array LBA basis in accordance with the preferred embodiment. The logical block address (LBA) translation RAID stack 200 reduces complexity and reduces delay than prior designs which placed write cache below Dynamic Tier and data striping, where caching was done on a device LBA basis.

FIG. 2B illustrates RAID stack 220 of host LBA translation with VSet 222 that is used with Advanced Interactive eXecutive (AIX), UNIX®, Linux, and other common operating systems, starting with VSet to Array 224 providing array LBA and array ID at 226 with read/write cache 228 providing array LBA and array ID at 230. RAID stack 220 includes Dynamic Tier or Easy Tier® Remapping 232 providing remapped array LBA(s)/ID at 234, followed by common code (RAID) layers of data striping 212 providing logical device LBAs and LDNs (logical device numbers) 214, and parity striping 216, which provides physical device LBAs and LDNs 218.

In accordance with features of the invention, a method and controller 102 for implementing storage adapter enhanced write cache management including the write cache engine 132 implementing auto reads to write cache, performing a full or partial read hit from write cache typically with no firmware involvement, or all the way through to storage devices 108.

Figure 3:
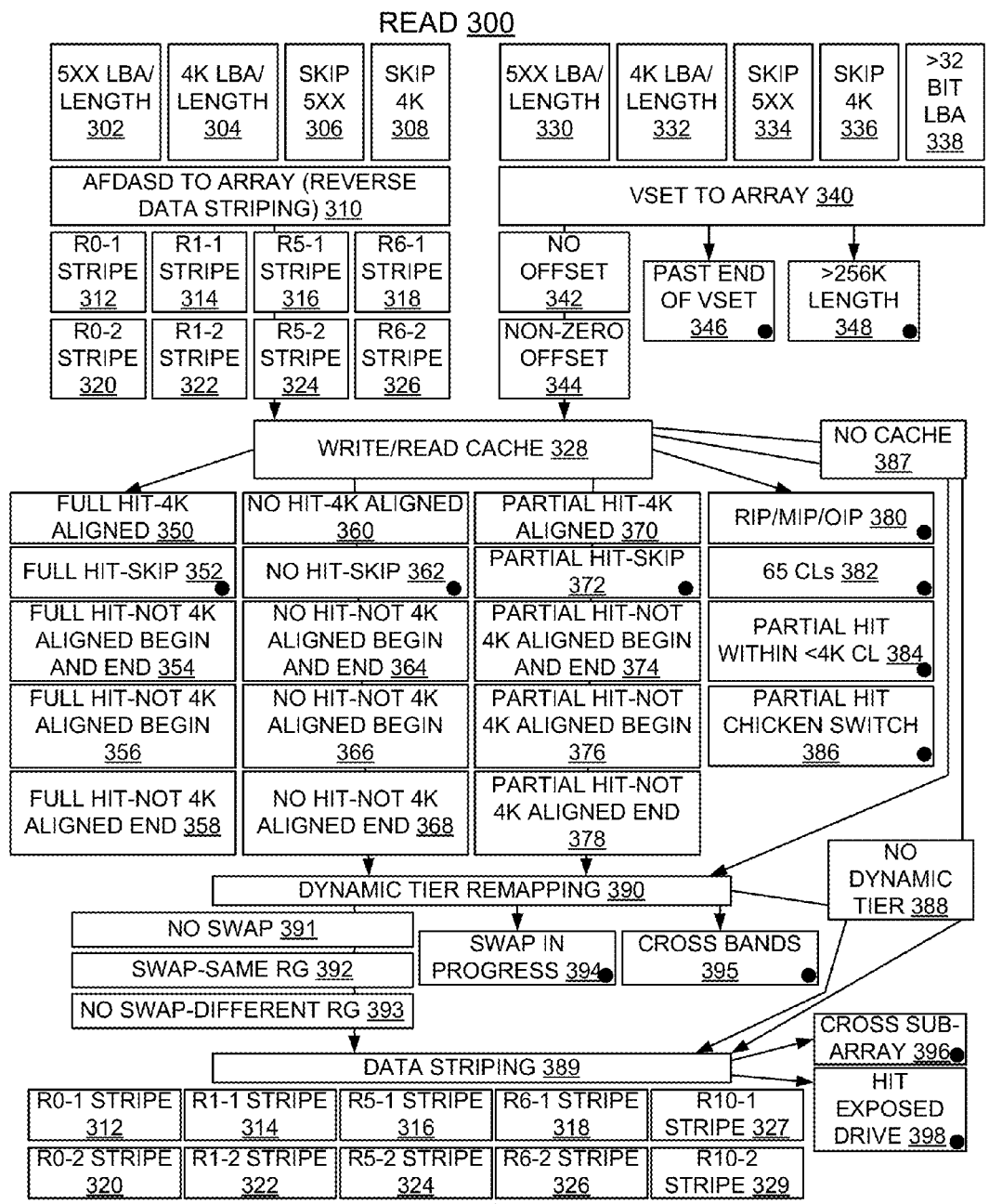
FIG. 3 illustrates example read operations supported in hardware including the example logical block address (LBA) translation of FIGS. 2A and 2B included with the controller for implementing storage adapter enhanced write cache management in accordance with the preferred embodiment.
Figure 4:
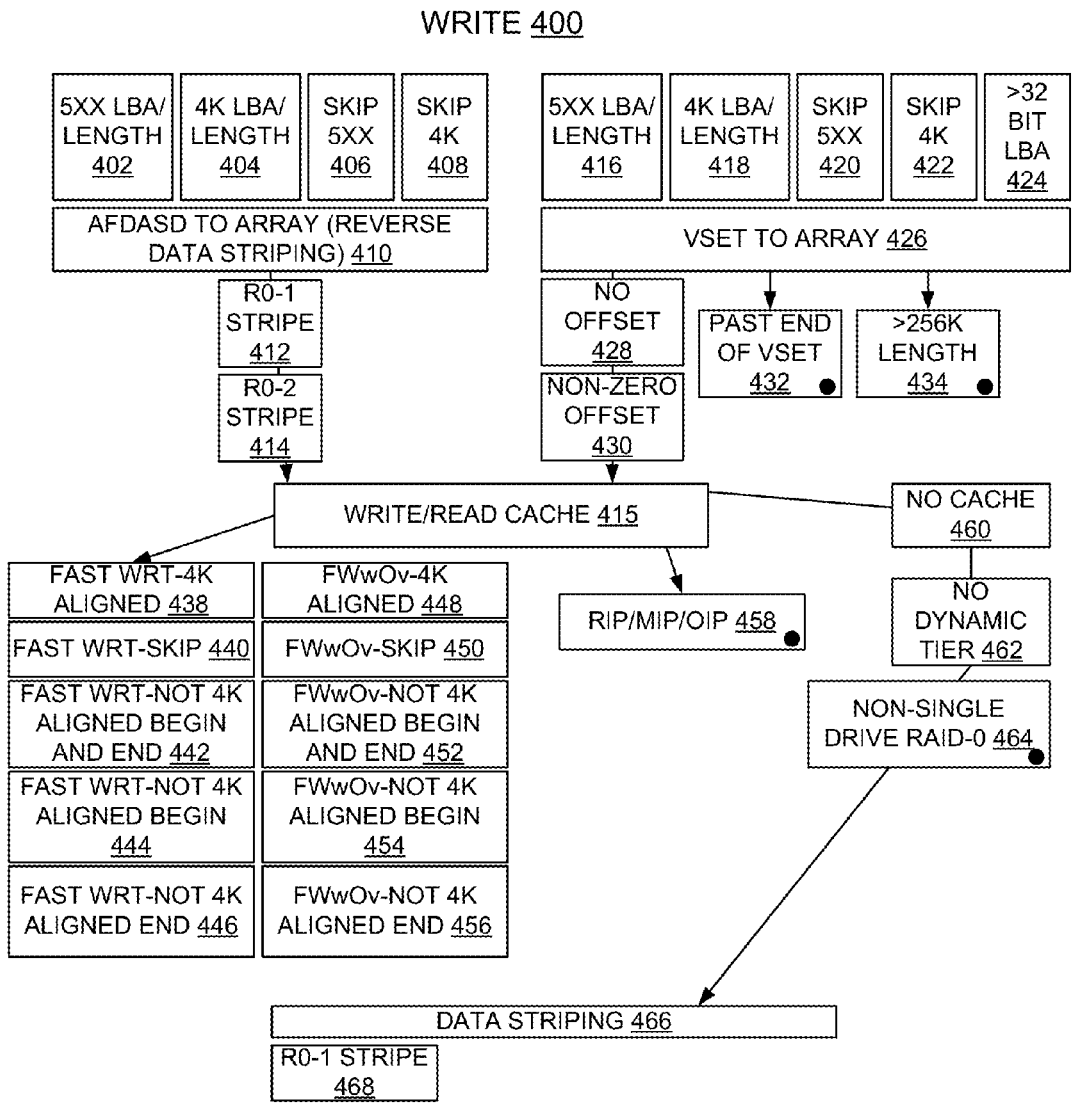
FIG. 4 illustrates example write operations supported in hardware including the example logical block address (LBA) translation of FIGS. 2A and 2B included with the controller for implementing storage adapter enhanced write cache management of FIGS. 1A and 1B with write cache placed high in the RAID stack, above Dynamic Tier (Easy Tier), data striping, and parity striping (RAID) layers in accordance with the preferred embodiment.
Figure 5:
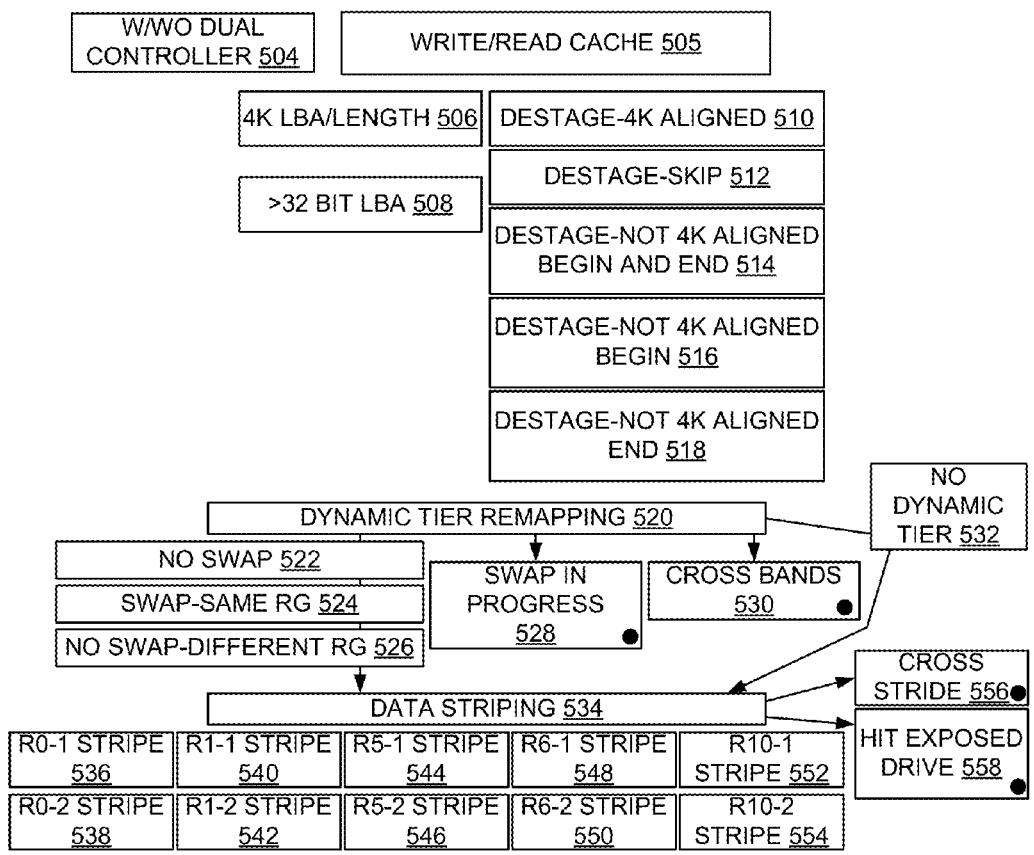
FIG. 5 illustrates example destage operations supported in hardware including the example logical block address (LBA) translation of FIGS. 2A and 2B included with the controller for implementing storage adapter enhanced write cache management in accordance with the preferred embodiment.

Referring to FIGS. 3, 4, and 5, there are shown example read, write and destage operations with blocks having a dot in the block corner indicating where hardware HW will pass control to firmware FW to handle an operation.

Referring now to FIG. 3, there are shown example read operations generally designated by the reference character 300 supported in hardware including the respective example logical block address (LBA) translation RAID stack of FIGS. 2A and 2B included with the controller 102 for implementing storage adapter enhanced write cache management in accordance with the preferred embodiment. For a host LBA and AFDASD RAID stack, read LBA length are shown at blocks 302, 304, and skip mask are shown at blocks 306, 308. An AFDASD to array or reverse data striping block 310 provides data stripe blocks 312, 314, 316, 318, 320, 322, 324, 326, as shown, applied to the write/read cache 328. For host LBA and Vset RAID stack, read LBA length are shown at blocks 330, 332, skip mask are shown at blocks 334, 336, and a greater than 32 bit at LBA 338. A VSet to Array block 340 provides a no offset block 342, a non-zero offset block 344, a past end of Vset block 346, and a less than 256K length block 348 applied to the write/read cache 328. As shown, write read cache 328 provides full hit, 4K aligned 350, full hit, skip 352, full hit, not 4K aligned begin and end 354, full hit, not 4K aligned begin 356, and full hit, not 4K aligned end 358. As shown, write read cache 328 provides no hit, 4K aligned 360, no hit, skip 362, no hit, not 4K aligned begin and end 364, no hit, not 4K aligned begin 366, and no hit, not 4K aligned end 368. As shown, write read cache 328 provides partial hit, 4K aligned 370, partial hit, skip 372, partial hit, not 4K aligned begin and end 374, partial hit, not 4K aligned begin 376, and partial hit, not 4K aligned end 378.

As shown, write read cache 328 provides read in progress (RIP), mirror in progress (MIP) and overlay in progress (OIP) at block 380, 65 cache lines (CLs) at block 382, partial hit within less that 4K CL at block 384, and partial hit chicken switch at block 386, to accommodate an exception situation. As indicated at block 387 with no cache and no dynamic tier at block 388, the read goes to data striping block 389, which provides data stripe blocks 312, 314, 316, 318, 320, 322, 324, 326, 327, and 329 as shown. Otherwise, a dynamic tier 390 provides no swap at block 391, swap-same Redundancy Group (RG) at block 392, no swap-different RG at block 393, swap in progress at block 394, and/or cross bands at block 395. Data striping block 389 provides cross sub-array at block 396, and/or hit exposed drive at block 398.

In accordance with features of the invention, a method and controller 102 for implementing storage adapter enhanced write cache management including the write cache engine 132 implement Auto Write operations supported in HW where the hardware generates a chain of operations, using different control blocks or hardware engines, to perform a write or write-with-overlay into the write cache typically with no firmware involvement.

Referring now to FIG. 4, there are shown illustrates example write operations generally designated by the reference character 400 supported in hardware including the respective example logical block address (LBA) translation RAID stack of FIGS. 2A and 2B included with the controller 102 for implementing storage adapter enhanced write cache management in accordance with the preferred embodiment. For a host LBA and AFDASD RAID stack, write LBA length are shown at blocks 402, 404, and skip mask are shown at blocks 406, 408. An AFDASD to array or reverse data striping block 410 provides data stripe blocks 412, 414, as shown, applied to the write/read cache 415. For host LBA and Vset RAID stack, read LBA length are shown at blocks 416, 418, skip mask are shown at blocks 420, 422, and a greater than 32 bit LBA at block 424. A VSet to Array block 426 provides a no offset block 428, a non-zero offset block 430, a past end of Vset block 432, and a greater than 256K length block 434 applied to the write/read cache 415. As shown, write read cache 415 provides fast write, 4K aligned 438, fast write, skip 440, fast write, not 4K aligned begin and end 442, fast write, not 4K aligned begin 444, fast write, not 4K aligned end 446. As shown, write read cache 415 provides fast write (FW) with overlay (Ov), 4K aligned 448, fast write (FW) with overlay (Ov), skip 450, fast write (FW) with overlay (Ov), not 4K aligned begin and end 452, fast write (FW) with overlay (Ov), not 4K aligned begin 454, fast write (FW) with overlay (Ov), not 4K aligned end 456. As shown, write read cache 415 provides read in progress (RIP), mirror in progress (MIP) and overlay in progress (OIP) at block 458. As indicated at block 460 with no cache and no dynamic tier at block 462 and non-single drive RAID-0 at block 464, the write goes to data striping block 466, which provides a data R0-1 stripe block 468

Referring now to FIG. 5, there are shown example destage operations generally designated by the reference character 500 supported in hardware including the example logical block address (LBA) translation of FIGS. 2A and 2B included with the controller 102 for implementing storage adapter enhanced write cache management in accordance with the preferred embodiment. As shown at block 502, a destage search starts at either LRU (linked list used in array), or an array offset (array LBA); and the destage search ends at a maximum requested size or span, or the end of a 256K stripe boundary (64 CLs). CLs with DIP, MIP, or OIP set are noted but otherwise ignored. As shown at block 504, the destage operations are provided with or without the dual controller 102. Unlike read and write operations 300, 400, firmware is used to produce chains of hardware operations to perform an overall destage. This is done since the number of variations for destages, due to support of many different RAID levels and other complexities, is too much for the hardware to handle without firmware assistance. A write/read cache 505 is shown with 4K LBA/length block 506, and greater than 32 bit LBA block 508. Destage operations include destage, 4K aligned 510, destage skip 512, destage not 4K aligned begin and end 514, destage, not 4K aligned begin 516 and destage, not 4K aligned end 518. A dynamic tier remapping block 520 provides no swap at block 522, swap-same RG at block 524, no swap-different RG at block 526, swap in progress at block 528, and/or cross bands at block 530. As indicated at block 532 with no dynamic tier, the destage goes to data striping block 534, which provides data stripe blocks 536, 538, 540, 542, 544, 546, 548, 550, 552, 554, as shown. Data striping block 534 provides cross sub-array at block 556, and/or hit exposed drive at block 558.

Referring now to FIG. 6 there is shown an example cache line (CL) structure in control store (CS) generally designated by the reference character 600 included with the controller 102 for implementing storage adapter enhanced write cache management in accordance with the preferred embodiment. The cache line (CL) structure 600 includes bytes 0-7 with CS State definitions as follows:
7=Allocated CL, set by allocate engine
6=Locality bit
5=PIP (Purge in progress) turned on and increment counter when CL is marked for Purge(decrement a counter on de-allocate)
4=MIP (Minor in progress), in HASH, in LRU
3=HASH Links Valid (may or may not be in LRU)
2=RIP (Read in progress) May or may not be in LRU
1=DIP (Destage in progress) Not in LRU
0=OIP (Overlay remove after minor, Combine Mask Merge in progress) Not in LRU.

The CL state definitions which allows the following states to be tracked: Mirror In Progress (MIP), during a write operation while mirroring data/directory to local/remote NV memory; Overlay In Progress (OIP), during a write with overlay operation; Read In Progress (RIP), during a read operation; and Destage In Progress (DIP), during a destage operation. The operation (OP) build number is incremented with each cache entry. The CS address Up pointer for LRU, lower 6 bits=0, and CS address Down or next pointer for LRU, lower 6 bits=0. The CS address previous pointer for hash, lower 6 bits=0, and CS address next pointer for hash, lower 6 bits=0. The cache line (CL) structure 600 includes compression index values.

The Locality bit is set and a counter is incremented for all the CLs after the first one on an NV Allocate operation. The counter is decremented for every CL with the Locality bit set on an NV Deallocate. This counter is used by FW when it is determining how full it should allow the Write Cache to be before starting a Destage operation. A high Locality count allows a fuller WC.

Referring now to FIG. 7, there is shown an example cache line (CL) structure in control store (CS) for auto mirror to data store (DS) generally designated by the reference character 700 included with the controller for implementing storage adapter enhanced write cache management in accordance with the preferred embodiment. The cache line (CL) structure in control store (CS) for auto mirror 700 to data store (DS) includes array ID, mask, 6B array offset, 0x80 or C0, operation (OP) build number, and compression index values.

Referring now to FIG. 8 illustrates an example cache line (CL) structure in data store (DS) generally designated by the reference character 800 included with the controller for implementing storage adapter enhanced write cache management in accordance with the preferred embodiment. As shown, the CL in DS 800 has the minimal information needed to identify that the CL is valid (i.e. allocated), what array ID and LBA the data is for, the op build number, and the compression related information.

Figure 9:
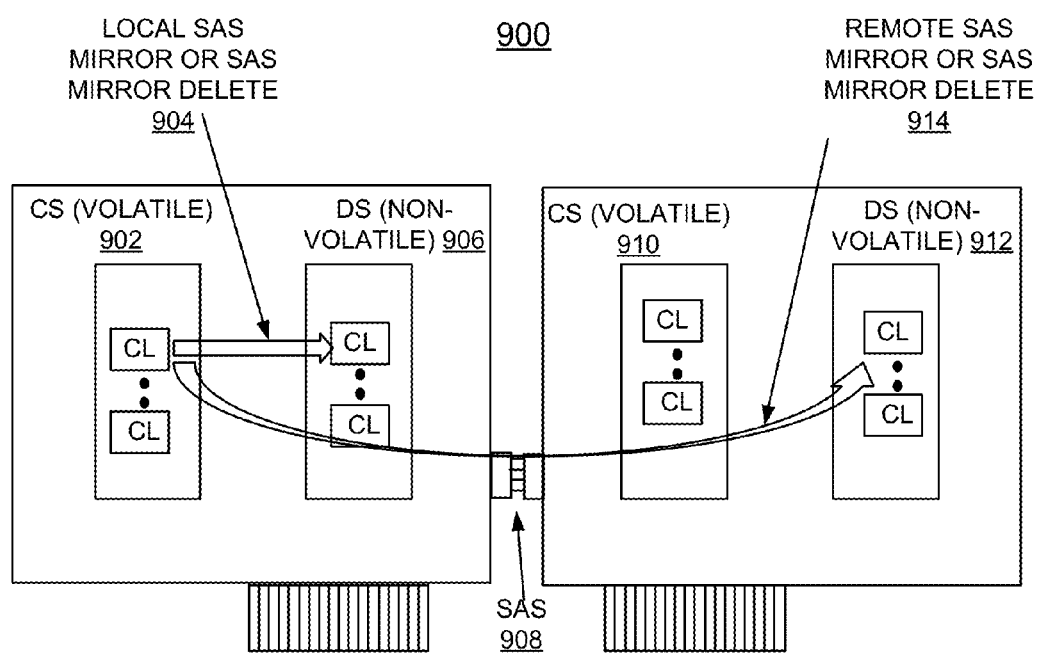
FIG. 9 illustrates an example local SAS and remote SAS cache line (CL) control store (CS) mirror or SAS mirror delete to data store (DS) included with the controller for implementing storage adapter enhanced write cache management in accordance with the preferred embodiment.

Referring now to FIG. 9, there is shown an example local SAS and remote SAS cache line (CL) control store (CS) mirror or SAS mirror delete to data store (DS) generally designated by the reference character 900 included with the controller for implementing storage adapter enhanced write cache management in accordance with the preferred embodiment. A local SAS cache line (CL) control store (CS) 902 includes a local SAS minor or SAS mirror delete path 904 to a local data store DS 906. A SAS interconnect 908 is provided to a remote SAS cache line (CL) control store (CS) 910 and a remote data store DS 912. A remote SAS mirror or SAS mirror delete path 914 is provided from the local CS 902 to the remote data store DS 912.

Figure 10A:
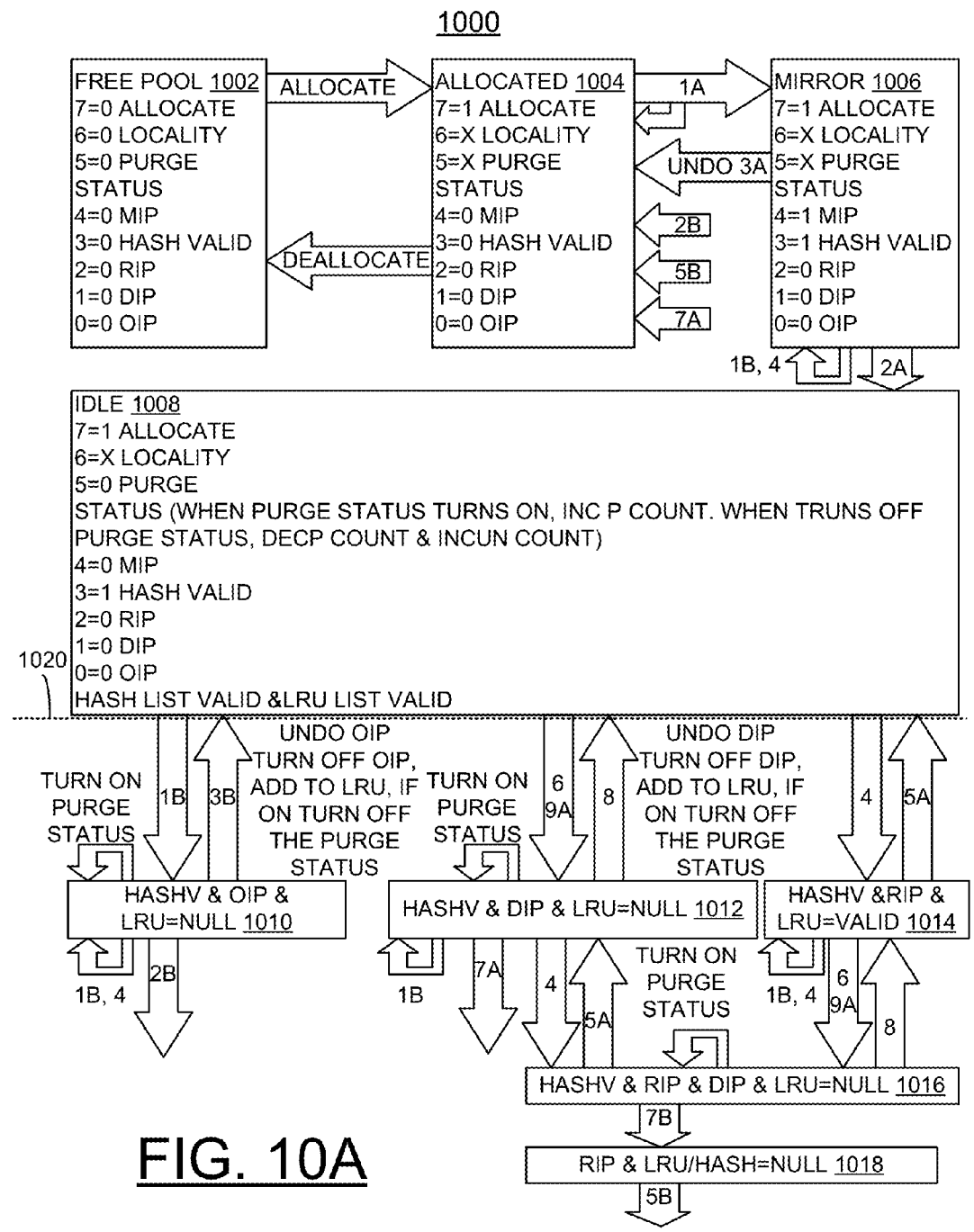

Referring now to FIGS. 10A and 10B illustrates example transactions in cache line (CL) states in hardware generally designated by the reference character 1000 included with the controller 102 for implementing storage adapter enhanced write cache management in accordance with the preferred embodiment. Cache line CL state transactions 1000 include a Free Pool 1002, Allocated 1004, Minor 1006 with HASH and LRU valid, and Idle 1008 with HASH List valid and LRU List valid. Each of the Free Pool 1002, Allocated 1004, Minor 1006, and Idle 1008 include CL states of 7=Allocated CL, set by allocate engine, 6=Locality bit, 5=Purge status, 4=MIP, 3=HASH Links Valid, 2=RIP, 1=DIP, and 0=OIP, as shown. Cache line CL state transactions 1000 include HASHV & OIP & LRU=NULL 1010, HASHV, & DIP & LRU=NULL 1012, and HASHV & DIP & LRU=VALID 1014, HASHV & RIP & DIP & LRU=NULL 1016, and RIP & LRU/HASH=NULL 1018. Below a line labeled 1020, HASHV, RIP, DIP, OIP are listed only if set.

Referring also to FIG. 10B together with respective CL state transactions lines 1A-9B in FIG. 10A, cache line CL state transactions 1000 include an Install at 1022 includes loop this control block (CB) if 1B finds MIP/RIP/DIP/OIP set. As shown at line 1A, a page list is read, and for each CL, MIP & HASHV are tuned on together with adding to LRU and HASH. As shown at line 1B, a next CL is searched in HASH for the same Array ID & Array Offset, for each CL found, turn on OIP, remove from LRU, put SAS delete CL minor page list. As shown at 1024 turn off MIP & OIP. As shown at line 2A, read page list, for each CL turn off MIP. As shown a line 2B, read next CL if OIP set and same Array ID and Array Offset, for each CL found turn off OIP, turn off HASHV, remove form HASH, put on Deallocate Page List.

As shown at 1026, Undo Install. As shown at line 3A, the page list is read, for each CL, turn off MIP, turn off HASHV, and remove from HASH. As shown at line 3B, the next CL is read, turn off OIP, turn off PURGE, and add back into LRU. As shown at 1028, read search loop this CB to WQ, if "4" finds MIP/RIP/OIP. As shown at line 4, search HASH for matching Array ID and Array Offset, each CL found turn on RIP, put on combo HDMA2h Page List; and otherwise, write volume Index to Combo Page List.

As shown at 1030, turn off RIP; read combo Page List, use skip mask. As shown at line 5A, each CL found with HASHV on, turn of RIP. Each CL found with HASHV off, turn off RIP, put on Deallocate Page List, as shown at line 5B. As shown at 1032, destage, ignore DIP/MIP/OIP. As shown at line 6, search HASH for a 256 KB range of Array Offset, for each CL found turn on DIP, remove from LRU, put on Page List. As shown at 1034, turn off DIP, read page list. As shown at line 7A, for each CL found with RIP off, turn off DIP, turn off HASHV, remove from HASH, put on Deallocate Page List. As shown at line 7B, for each CL found with RIP on, turn off DIP, turn off HASHV, remove from HASH.

As shown at 1036, undo destage. As shown at line 8, read page list, turn off DIP, turn off Purge Status, and add back to LRU. As shown at 1038, Purge, ignore MIP or Allocate=0 or 4:0=0 or if Purge Status=1. As shown at line 9A, for each CL found with OIP/DIP off, and HASHV on, turn on Purge Status, turn on DIP, and remove from LRU, put on Deallocate Page List. As shown at line 9B, for each CL found with OIP/DIP on, or HASHV off, turn on Purge Status.

Figure 11A:
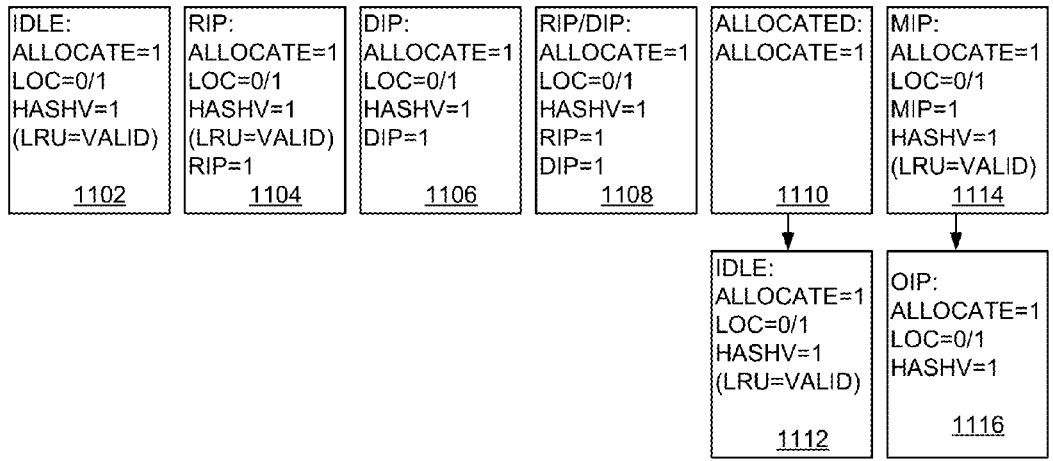
FIGS. 11A and 11B illustrates example cache line (CL) chains having same array ID/LBA in hardware included with the controller for implementing storage adapter enhanced write cache management in accordance with the preferred embodiment.
Figure 11B:
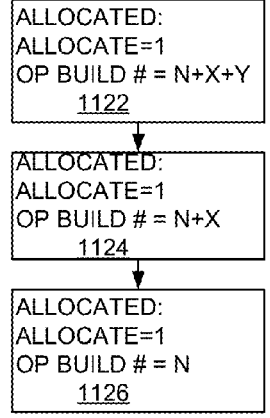

Referring now to FIGS. 11A and 11B, there are shown example cache line (CL) chains having same array ID/LBA respectively generally designated by the reference character 1100, 1120 included with the controller 102 for implementing storage adapter enhanced write cache management in accordance with the preferred embodiment. In FIG. 11A, example CL chains 1100 in Control Store (CS) with same Array ID/LBA include IDLE 1102 including Allocate=1, LOC=0/1, HASHV=1, (LRU=valid); RIP 1104 including Allocate=1, LOC=0/1, HASHV=1, (LRU=valid), RIP=1; DIP 1106 including Allocate=1, LOC=0/1, HASHV=1, DIP=1; RIP/DIP 1108 including Allocate=1, LOC=0/1, HASHV=1, RIP=1, DIP=1; ALLOCATED 1110 including Allocate=1 and IDLE 1112 including Allocate=1, LOC=0/1, HASHV=1, (LRU=valid), and MIP 1114 including Allocate=1, LOC=0/1, MIP=1, HASHV=1, (LRU=valid), and OIP 1116 including Allocate=1, LOC=0/1, HASHV=1, as shown.

In FIG. 11B, example CL chains 1100 in Data Store (DS) with same Array ID/LBA include ALLOCATED 1122 including Allocate=1 and Op build #=N+X+Y; ALLOCATED 1124 including Allocate=1 and Op build #=N+X; and ALLOCATED 1126 including Allocate=1 and Op build #=N.

Referring now to FIGS. 12A, 12B, 12C, and 12D respectively illustrate example control block (CB) based chain of operations in hardware engines for writes, non-optimized or provisional writes, reads and destage operations included with the controller for implementing storage adapter enhanced write cache management in accordance with the preferred embodiment.

Figures 12A, 12B:
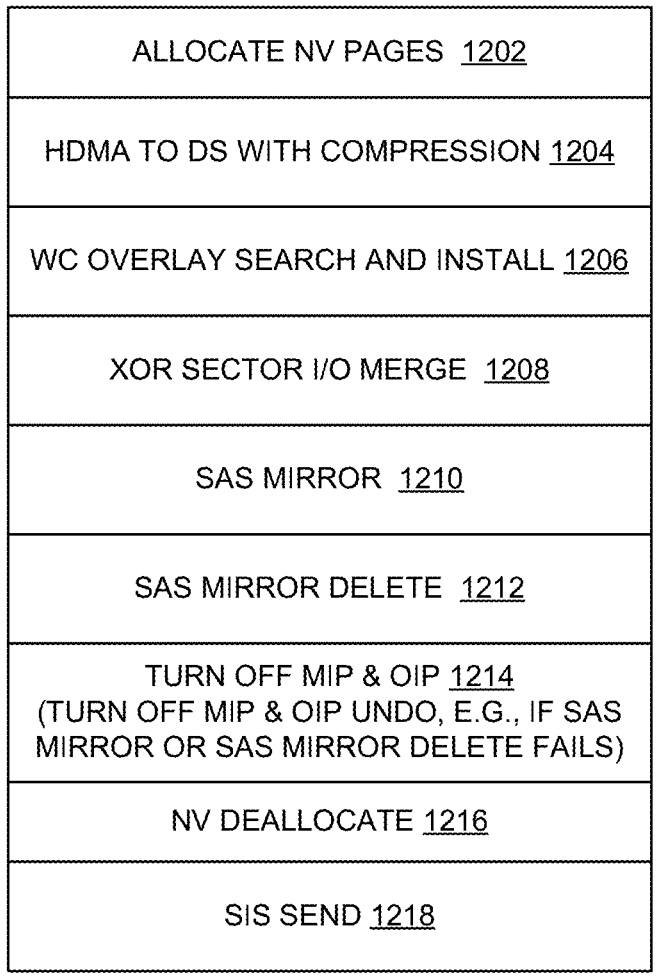
FIGS. 12A, 12B, 12C, and 12D respectively illustrate example control block (CB) based chain of operations in hardware engines for writes, non-optimized or provisional writes, reads and destage operations included with the controller for implementing storage adapter enhanced write cache management in accordance with the preferred embodiment.

In FIG. 12A, the example write process generally designated by the reference character 1200 includes an allocate NV pages 1202 allocating an A Page list in Data Store (DS); Host DMA to DS with Compression 1204 for DMAing data from host into the A Page List; a Write Cache (WC) Overlay Search and Install 1026 determining if existing data in cache may have been overlaid while updating CL states (turn on MIP and generate OIP list or B Page List, determine if sector IO is needed); XOR Sector I/O Merge 1208 merging non-4K data at the beginning and end of the write operation; SAS Minor 1210 mirroring A page list new data to local NV DS and to remote NV DS; SAS Minor Delete 1212 minor deleting B Page list; turn off MIP & OIP 1214 turning off MIP for A Page list and generating new list of OIP or C Page List and turn off MIP & OIP Undo, for example, if SAS Mirror or SAS Mirror Delete fails; NV Deallocate 1216 deallocating overlaid pages or C Page List; and SIS Send 1218 sending a response to the host.

In FIG. 12B, the example non-optimized or provisional write process generally designated by the reference character 1220 includes XOR Vol to NV copy without compression 1222.

Figure 12C:
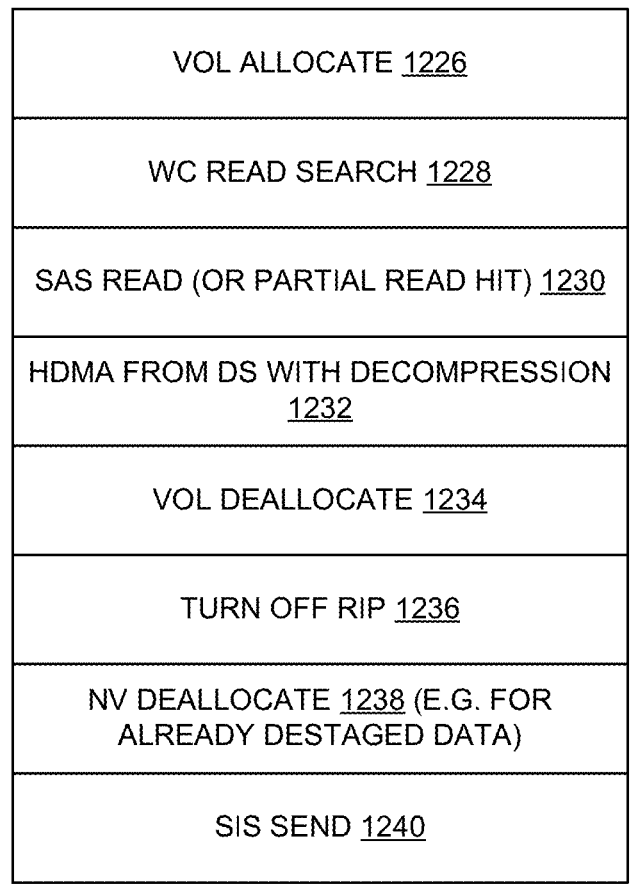

In FIG. 12C, the example read process generally designated by the reference character 1224 includes Vol Allocate 1126; WC Read Search 1228; SAS Read (or partial read hit) 1230; HDMA from DS with decompression 1232; Vol Deallocate 1234; Turn Off RIP 1236; NV Deallocate 1238, for example, for already destaged data; and SIS Send 1240.

Figure 12D:
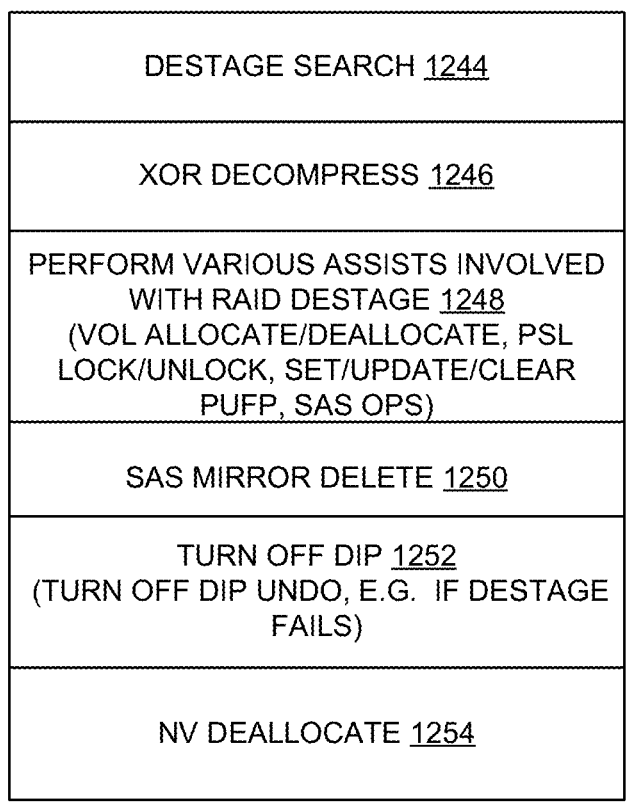

In FIG. 12D, the example destage process generally designated by the reference character 1242 includes Destage Search 1244; XOR Decompress 1246; Perform Various assists involved with RAID Destage 1248, such as, Vol Allocate/Deallocate, PSL Lock/Unlock, Set/Update/Clear parity update footprint (PUFP), SAS ops; SAS Minor Delete 1250; Turn Off DIP 1252, and Turn Off DIP Undo, for example, if Destage fails; and NV Deallocate 1254.

Figure 13:
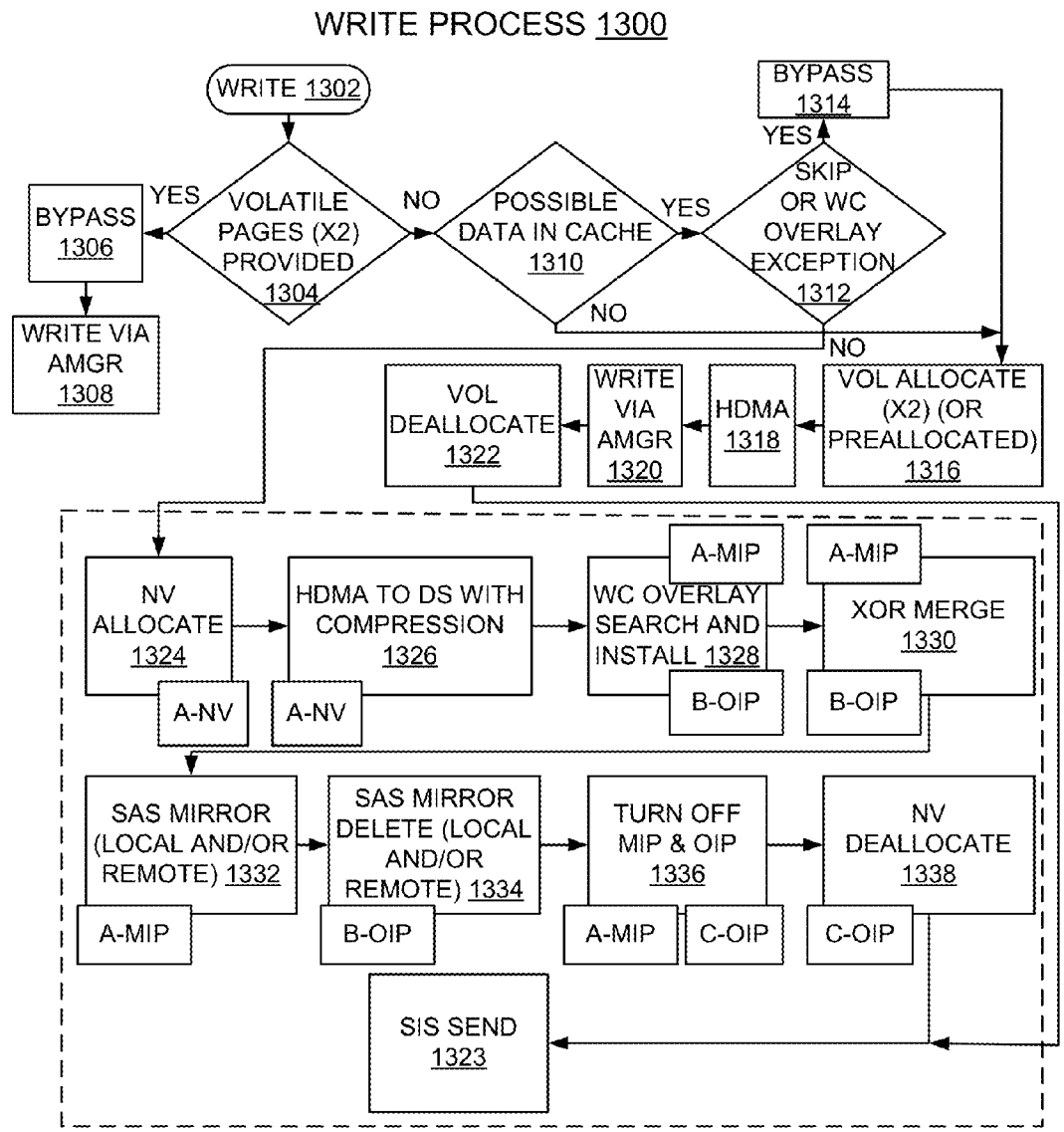
FIG. 13 is a flow chart illustrating example operations of a write process included with the controller for implementing storage adapter enhanced write cache management in accordance with the preferred embodiment.

Referring now to FIG. 13, there is shown a flow chart illustrating example operations generally designated by the reference character 1300 of a write process included with the controller 102 for implementing storage adapter enhanced write cache management in accordance with the preferred embodiment starting at a block 1302. Checking for volatile pages (×2) provided is performed as indicated at a decision block 1304. When volatile pages are provided, then bypass as indicated at a block 1306 and write via AMGR as indicated at a block 1308. Otherwise when volatile pages are not provided, then checking for possible data in cache is performed as indicated at a decision block 1310. When possible data in cache is identified, then checking for skip or WC overlay exception is performed as indicated at a decision block 1312. When skip or WC overlay exception is identified, then volatile allocate (×2) or preallocated is provided as indicated at a block 1316, host direct memory access (HDMA) as indicated at a block 1318, write via AMGR as indicated at a block 1320, and Vol Deallocate as indicated at a block 1322. As indicated at a block 1323, then SIS Send is provided sending a response to the host.

Otherwise when the skip or WC overlay exception is not identified, then a write into write cache is performed in accordance with the preferred embodiments by performing HW chained steps of: allocate NV pages 1324 allocating an A Page list in Data Store (DS); Host DMA to DS with Compression 1226 for DMAing data from host into the A Page List; a Write Cache (WC) Overlay Search and Install 1328 determining if existing data in cache may have been overlaid while updating CL states (turn on MIP and generate OIP list or B Page List, determine if sector IO is needed); XOR Sector I/O Merge 1330 merging non-4K data at the beginning and end of the write operation; SAS Mirror 1332 mirroring A page list new data to local NV DS and/or to remote NV DS; SAS Minor Delete 1334 mirror deleting B Page list; turn off MIP & OIP 1336 turning off MIP for A Page list and generating new list of OIP or C Page List; NV Deallocate 1338 deallocating overlaid pages or C Page List; and SIS Send 1323 sending a response to the host.

Referring now to FIG. 14 illustrates an example XOR merge on fast write with overlay generally designated by the reference character 1400 included with the controller 102 for implementing storage adapter enhanced write cache management in accordance with the preferred embodiment. XOR merge on fast write with overlay 1400 includes a Buffer A including mirror in process (MIP) and new data 1402 and a Buffer B including overlay in process (OIP) and old data 1404 that is merged into Buffer A including MIP and merged data 1406.

Figure 15:
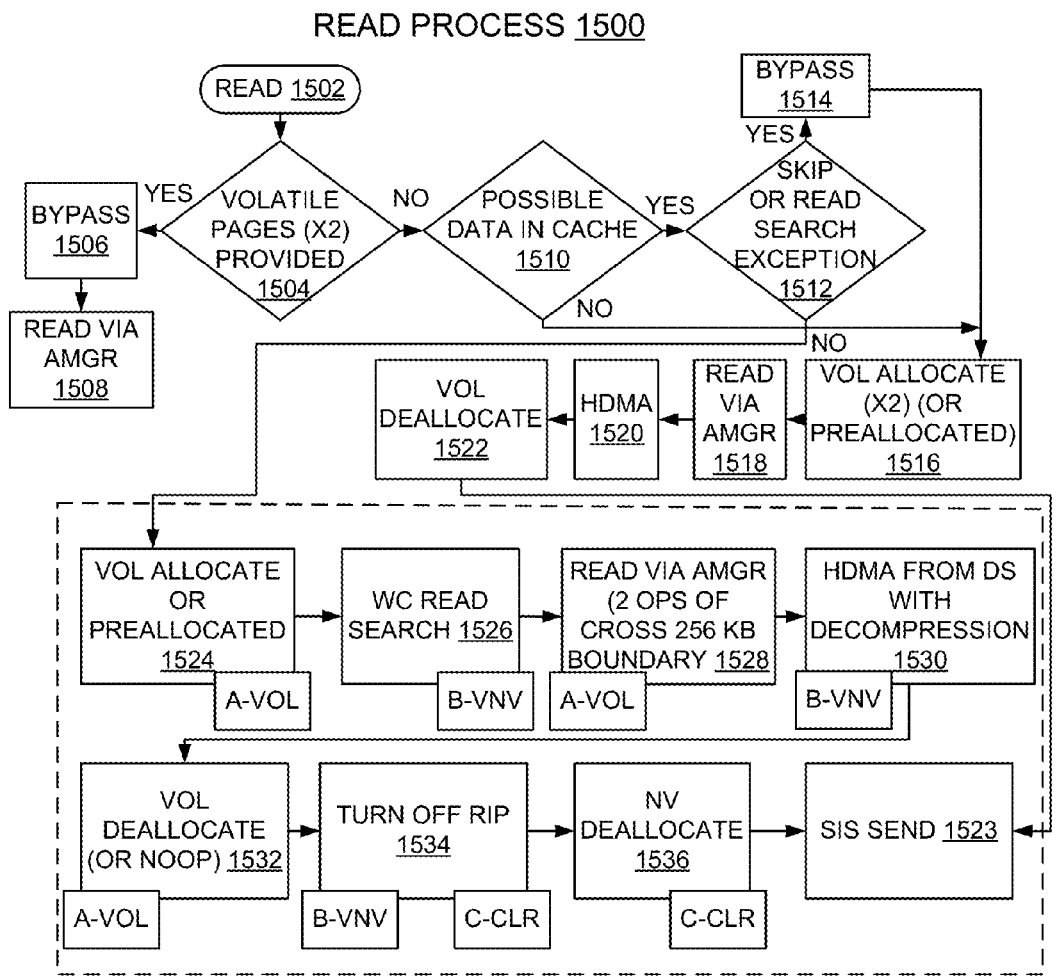
FIG. 15 is a flow chart illustrating example operations of a read process included with the controller for implementing storage adapter enhanced write cache management in accordance with the preferred embodiment.

Referring now to FIG. 15, there is shown a flow chart illustrating example operations generally designated by the reference character 1500 of a read process included with the controller 102 for implementing storage adapter enhanced write cache management in accordance with the preferred embodiment starting at a block 1502. Checking for volatile pages (×2) provided is performed as indicated at a decision block 1504. When volatile pages are provided, then bypass as indicated at a block 1506 and read via AMGR as indicated at a block 1508. Otherwise when volatile pages are not provided, then checking for possible data in cache is performed as indicated at a decision block 1510. When possible data in cache is identified, then checking for skip or read search exception is performed as indicated at a decision block 1512. When skip or read search exception is identified, then bypass as indicated at a block 1514 and volatile allocate (×2) or preallocated is provided as indicated at a block 1516, read AMGR as indicated at a block 1518, host direct memory access (HDMA) as indicated at a block 1520, and Vol Deallocate as indicated at a block 1522. As indicated at a block 1523, then SIS Send is provided sending a response to the host.

Otherwise when the skip or read search exception is not identified, then a read from write cache is performed in accordance with the preferred embodiments by performing HW chained steps of: Vol Allocate 1524 providing A-Vol; WC Read Search 1526 with B containing Vol indexes from A and NV indexes for data in cache, skip bits also generated; Read via AMGR (2 ops of cross 256 KB boundary) 1528; HDMA from DS with decompression 1530 receiving B-NVv; Vol Deallocate 1532 (or no op) receiving A-Vol; Turn Off RIP 1534 receiving B-NVv and providing C-CLr with RIP turned off for indexes that have skip bits set; NV Deallocate 1536, providing C-CLr for example, for already cleared by a destage so only need to deallocate the NV indexes; and SIS Send 1523.

Figure 16:
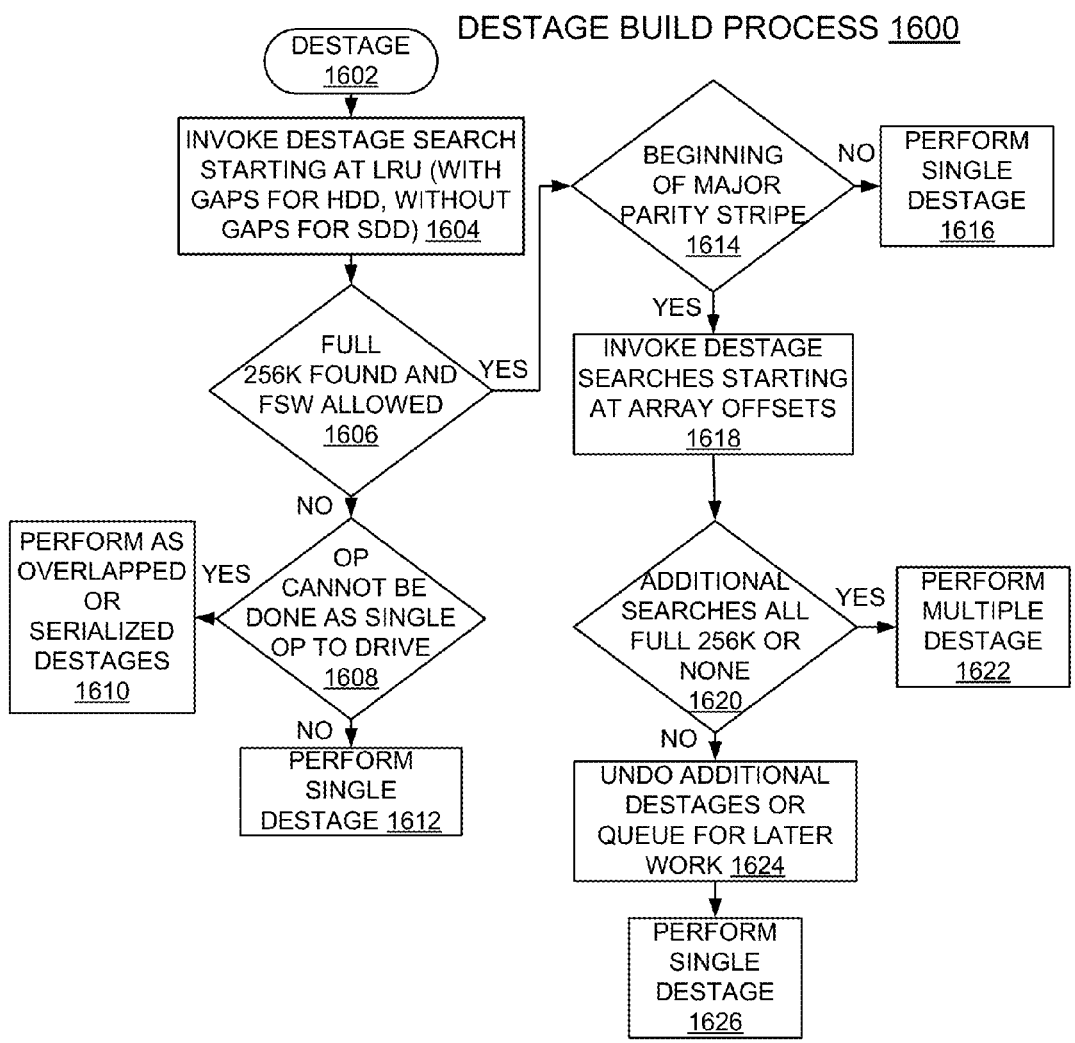
FIG. 16 is a flow chart illustrating example operations of a destage build process included with the controller for implementing storage adapter enhanced write cache management in accordance with the preferred embodiment.

Referring now to FIG. 16, there is shown a flow chart illustrating example operations generally designated by the reference character 1600 of a destage build process included with the controller 102 for implementing storage adapter enhanced write cache management in accordance with the preferred embodiment starting at a block 1602.

In accordance with features of the invention, a hardware engine assists in generating a destage operation with options to start at either the LRU or a specified array LBA, and to stop at either a max requested size/span or the end of a 256K stripe boundary. As indicated at a block 1604, a Destage Search is invoked with hardware assist which will search the write cache, via the hash table and/or LRU queue, in order to generate a destage (turn on DIP), with options to start at either the LRU or a specified array LBA, or starting at LRU (with gaps for HDD, without gaps for SSD) as shown. Checking for full 256 K found and Full Stripe Write (FSW) allowed is performed as indicated at a decision block 1606. When full 256 K found and FSW allowed is not found, checking for Op cannot be done as single op to drive is performed as indicated at a decision block 1608. When Op cannot be done as single op to drive is found, the overlapped or serialized destages are performed as indicated at a block 1610, for example because of gaps when drives do not support skip ops or CL contain sector I/O with possible gaps. When Op cannot be done as single op to drive is not found, then a single destage is performed as indicated at a block 1612.

When full 256 K found and FSW allowed is identified, then as indicated at a decision block 1614 checking beginning of major parity stripe is performed. When beginning of major parity stripe is not found, then a single destage is performed as indicated at a block 1616. When beginning of major parity stripe is found, then destage searches are invoked starting at array offsets as indicated at a block 1618. Checking additional searches all full 256 K or none is performed as indicated at a decision block 1620. If yes, then multiple destage is performed as indicated at a block 1622. If not, then undo additional destages or queue for later work as indicated at a block 1624. Then a single destage is performed as indicated at a block 1626.

Figure 17:
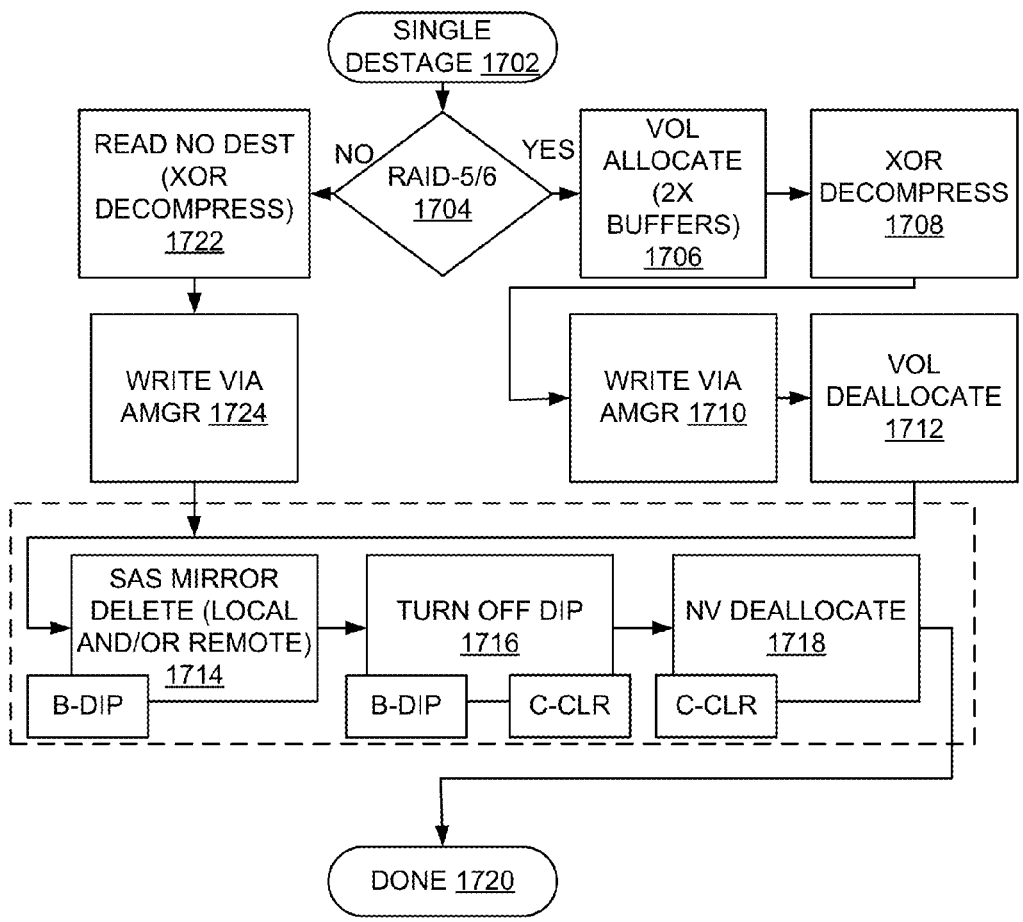
FIG. 17 is a flow chart illustrating example operations of a single destage process included with the controller for implementing storage adapter enhanced write cache management in accordance with the preferred embodiment.

Referring now to FIG. 17 is a flow chart illustrating example operations generally designated by the reference character 1700 of a single destage process included with the controller 102 for implementing storage adapter enhanced write cache management in accordance with the preferred embodiment starting at a block 1702. Checking for RAID 5 or 6 is performed as indicated at a decision block 1704. If RAID 5/6 is identified, then the following HW operations steps in accordance with the preferred embodiment are performed including: Vol Allocate (2× buffers) 1706, XOR Decompress 1708, write via AMGR 1710, Vol Deallocate 1712, SAS MIRROR Delete (local and/or remote) 1714, receiving B-DIP (Destage in process), Turn Off DIP 1716 receiving B-DIP, and providing C-CLr (Turn Off DIP Undo for example, if Destage fails), NV Deallocate 1718 receiving C-CLr, and operations done as indicated at block 1720.

If RAID 5/6 is not identified, then the following HW operations steps in accordance with the preferred embodiment are performed including: Read No Dest (XOR Decompress) 1722, write via AMGR 1724, and continue with SAS MIRROR Delete (local and/or remote) 1714, receiving B-DIP (Destage in process), Turn Off DIP 1716 receiving B-DIP, and providing C-CLr (Turn Off DIP Undo for example, if Destage fails), NV Deallocate 1718 receiving C-CLr, and operations done at block 1720.

Figure 18:
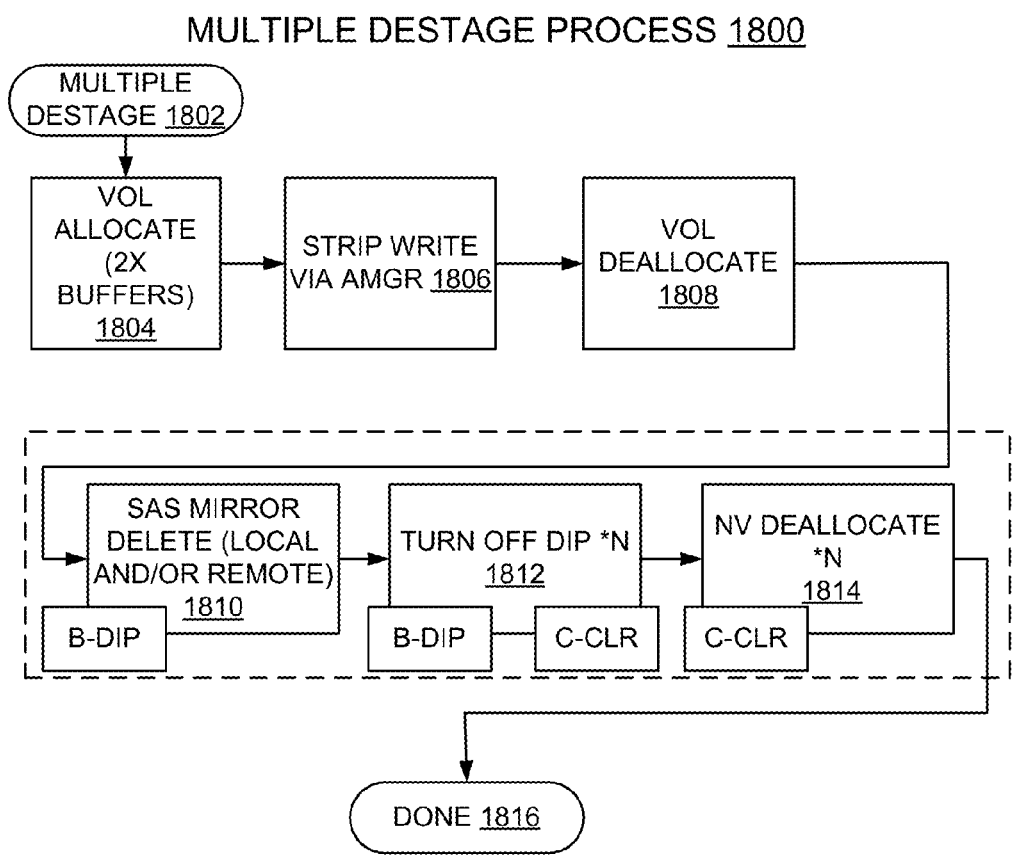
FIG. 18 is a flow chart illustrating example operations of a multiple destage process included with the controller for implementing storage adapter enhanced write cache management in accordance with the preferred embodiment.

Referring now to FIG. 18, there is shown a flow chart illustrating example operations generally designated by the reference character 1800 of a multiple destage process included with the controller 102 for implementing storage adapter enhanced write cache management in accordance with the preferred embodiment starting at a block 1802. The following HW operations steps in accordance with the preferred embodiment are performed including: Vol Allocate (2× buffers) 1804, Strip Write via AMGR 1806, Vol Deallocate 1808, SAS MIRROR Delete (local and/or remote) 1810, receiving B-DIP, Turn Off DIP*N 1812 receiving B-DIP, and providing C-CLr, NV Deallocate*N 1814 receiving C-CLr, and operations done as indicated at block 1816.

Figure 19:
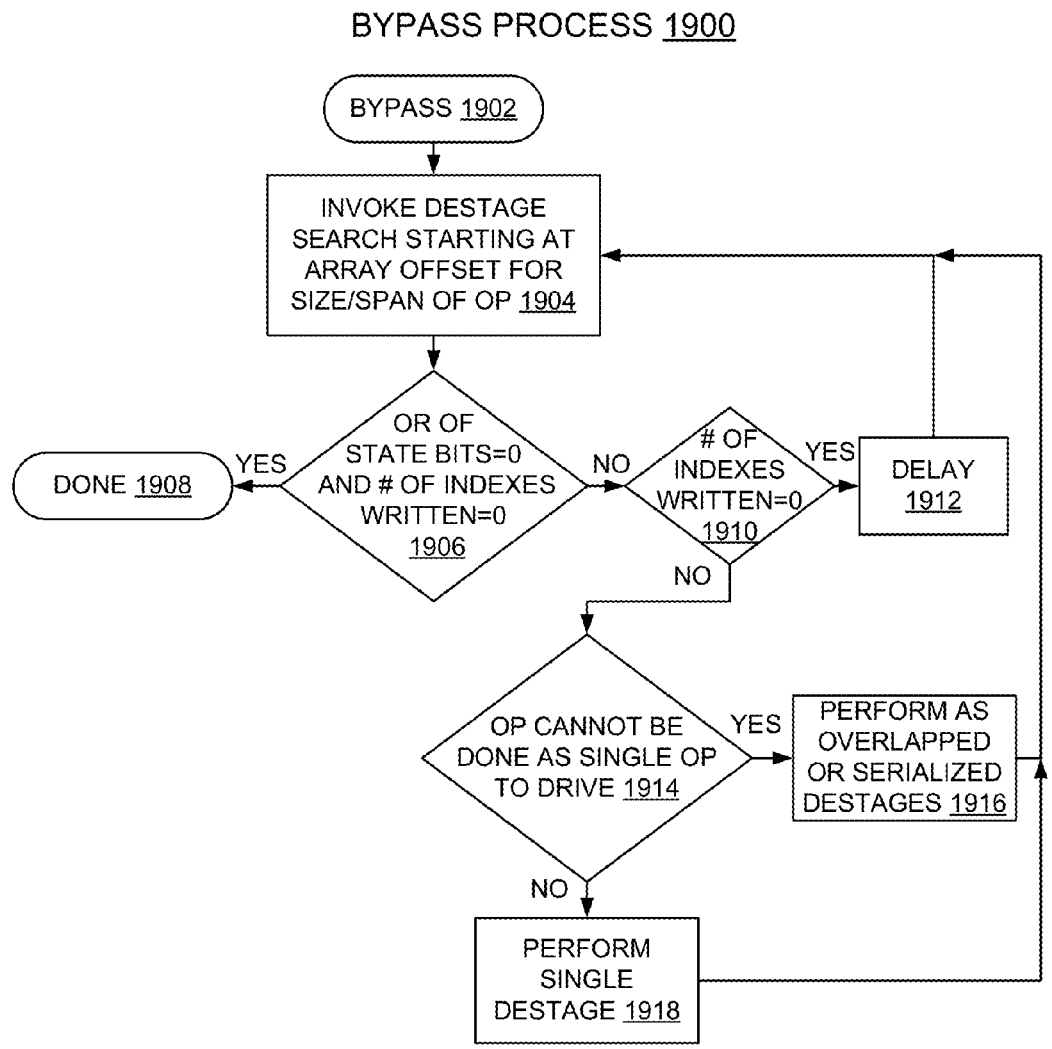
FIG. 19 is a flow chart illustrating example operations of a bypass process included with the controller for implementing storage adapter enhanced write cache management in accordance with the preferred embodiment.

Referring now to FIG. 19, there is shown a flow chart illustrating example operations generally designated by the reference character 1900 of a bypass process included with the controller 102 for implementing storage adapter enhanced write cache management in accordance with the preferred embodiment starting at a block 1902. A destage search is invoked starting at array offset for size/span of op as indicated at a block 1904. Checking for OR of state bits=0 AND # of indexes written=0 is performed as indicated at a decision block 1906. If yes, then operations are done as indicated at block 1908. Otherwise if not, then checking if # of indexes written=0 is performed as indicated at a decision block 1910. If the # of indexes written=0, then a delay is provided as indicated at block 1912, and operations return to block 1904 invoking a destage search and continue. If the # of indexes written is not equal to 0, then checking if op cannot be done as single op to drive is performed as indicated at a block 1914, for example, because of gaps but drives do not support skip ops or CL contains sector I/O with possible gaps. If op cannot be done as single op to drive, then overlapped or serialized destages are performed as indicated at a block 1916. If op can be done as single op to drive, then a single destage is performed as indicated at a 1918. Operations return to block 1904 invoking a destage search and continue.

Referring now to FIG. 20 illustrates example register based purge hardware assist tool kit generally designated by the reference character 2000 included with the controller 102 for implementing storage adapter enhanced write cache management in accordance with the preferred embodiment. As indicated at a block 2002, WC Hardware reads all the CLs, any that match this range will have the following occur: If Allocate=1, PIP=0, MIP=0, and HASHV=1 then turn on PIP and increment counter. If incremented counter, DIP=0, and OIP=0 then turn on DIP, remove from LRU, and put CL on the page table list. WC Engine can process CB during this time, this function will interleave with CB processing. FW loaded registers 2004 include:

Array ID(7:0) 2006
Starting Array Offset(44:0), bits(2:0)=0 since must be 4 KB aligned 2008
Ending Array Offset Size(44:0), bits(2:0)=0 since must be 4 KB multiple 2010
Page Table List pointer(31:0) 2012
Page Table Size(11:0), up to 4K−1 entries 2014
Page Table current Size(11:0) 2016
Current CL Index(24:0), 2018 (may be set to zero at start, held after a pause)
Max CL Index(24:0) 2020
Active bit, Page Table Interrupt bit 2022; and
Current Purge counter(24:0) 2024, deallocate will decrement for any CL with PIP bit set.

CL 2026 includes PIP (Purge in Progress) bit 2028 (Increments Purge Pending Count when set, decrement Purge Pending Count on deallocate). Event Q Entries 2030 include the above pauses when the Page Table list is full and send a Purge Page List EventQ entry 2032; when Purge finishes a sweep and the Page Table list is not empty then send a Purge Page List EventQ entry 2034 (11:10=type=11b), note: Must be restarted; and after both the Purge finishes and the counter is zero then send a Purge Done EventQ entry 2036 (11:10=type=10b). It is noted that FW uses a Destage Search in order to purge cache data for a small range of LBAs. The Purge engine should be used for larger ranges of LBAs.

Figure 21:
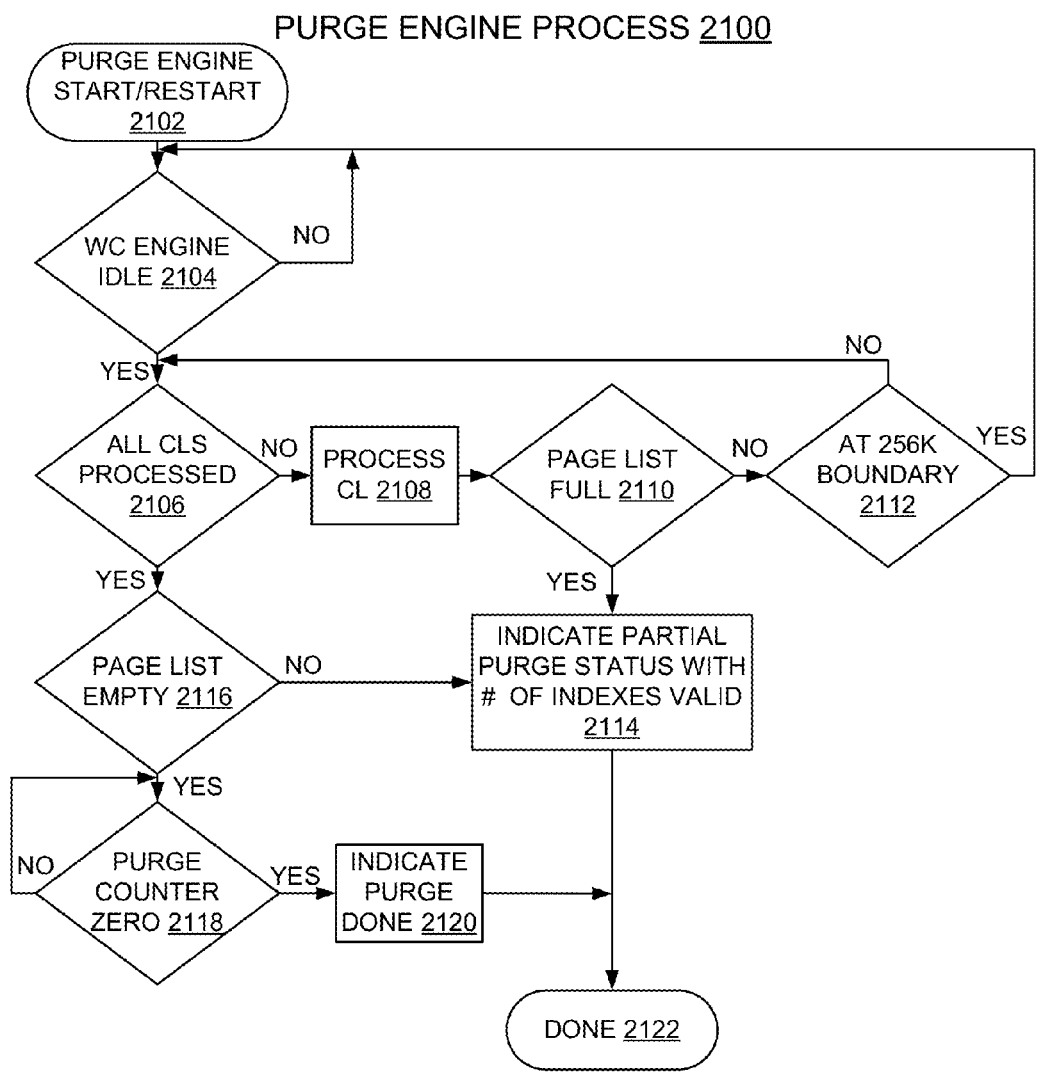
FIGS. 21 and 22 are flow charts illustrating example operations of a purge engine process included with the controller for implementing storage adapter enhanced write cache management in accordance with the preferred embodiment.
Figure 22:
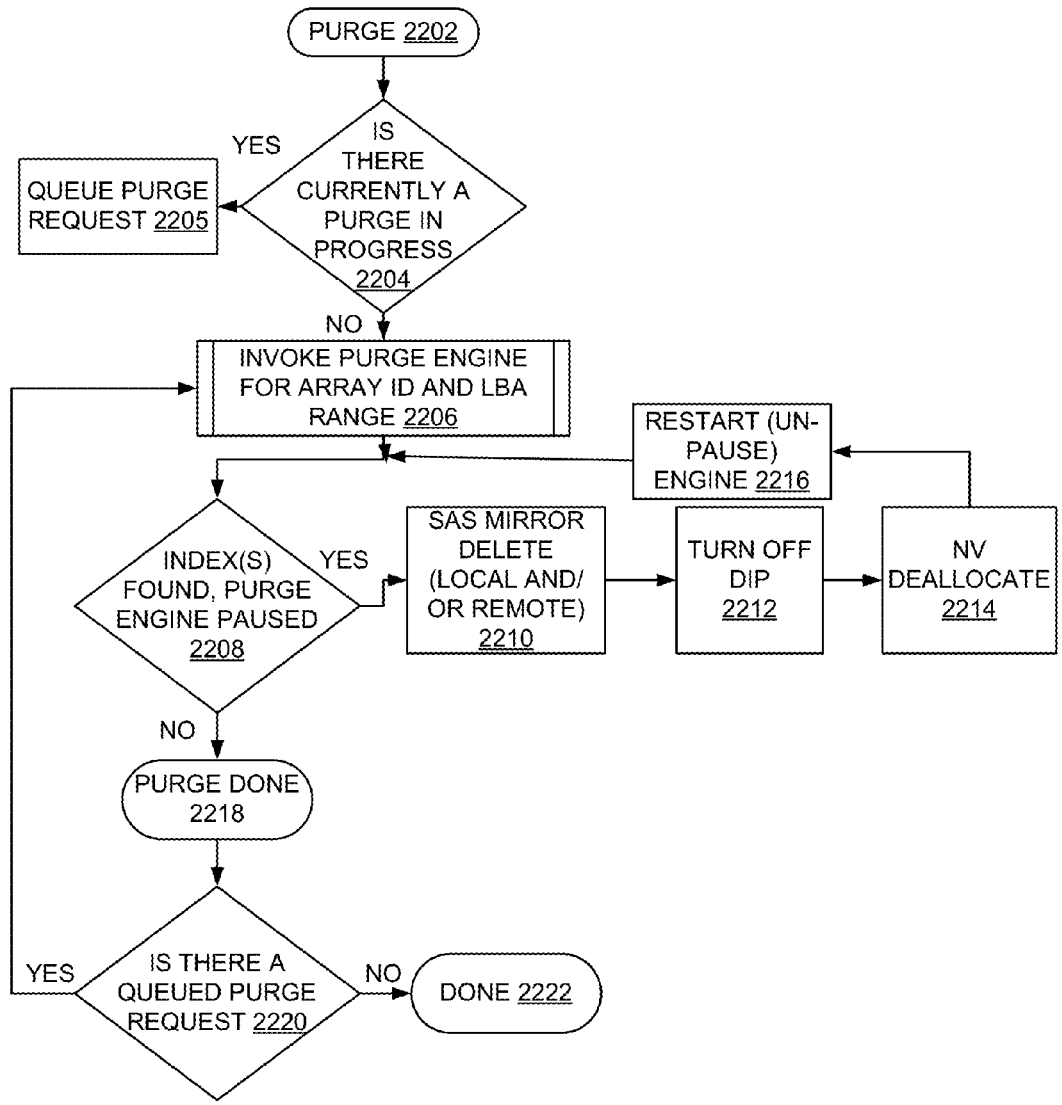

Referring now to FIGS. 21 and 22 are flow charts illustrating example operations respectively generally designated by the reference character 2100, 2200 of a purge engine process included with the controller 102 for implementing storage adapter enhanced write cache management in accordance with the preferred embodiment. In FIG. 21, the purge engine process starting at block 2102, checking for the WC engine being idle is performed as indicated at a decision block 2104. When WC engine being idle is identified, the checking for all CLs processed is performed as indicated at a decision block 2106. If not, the CL is processed as indicated at a block 2108 and checking for a page list full is performed as indicated at a decision block 2110. If the page list is not full, the checking if at a 256K boundary is performed as indicated at a decision block 2112. If so then the operations return to checking at decision block 2104 for the WC engine being idle and continue. Otherwise if the page list is full, then a partial purge is indicated with # of indexes valid is provided as indicated at a block 2114. When all CLs are processed, then checking for an empty page list is performed as indicated at a decision block 2116. If the page list is not empty, then the partial purge is indicated with # of indexes valid provided at block 2114. If the page list is empty, then checking for a zero purge counter is performed as indicated at a decision block 2118. If yes, purge done is indicated as indicated at a block 2120. Otherwise operations are done as indicated at block 2122.

Referring to FIG. 22, a purge request starts at block 2202 includes checking for a purge in process currently being performed as indicated at a decision block 2204. If yes, then the purge request is queued as indicated at a block 2205. Otherwise a purge engine routine is invoked for Array ID and LBA range as indicated at a block 2206. Checking for index(s) found, and purge engine paused is performed as indicated at a decision block 2208. If yes, then SAS minor delete is performed (local and/or remote) as indicated at a block 2210. DIP is turned off as indicated at a block 2212, and NV deallocate is provided as indicated at a block 2214. The purge engine is restarted (unpaused) as indicated at a block 2216, and checking for index(s) found, and purge engine paused returns to decision block 2208 and continues. When index(s) found, and purge engine paused is not identified, the purge is done as indicated at a block 2218. Then checking if there is a queued purge request is performed as indicated at a decision block 2220. If yes, then operations return to invoke the purge engine routine for Array ID and LBA range at block 2206 and continue. Otherwise operations are done as indicated at block 2222.

Referring now to FIG. 23, there are shown example hardware counters and statistics generally designated by the reference character 2300 included with the controller 102 for implementing storage adapter enhanced write cache management in accordance with the preferred embodiment. The hardware counters and statistics 2300 are maintained by HW on a per Array ID bases including:
Current Counter Value CL 2302
Current Counter Value Locality Bit 2304
HWM CL 2306
HWM Locality Bit 2308
LWM CL 2310
LWM Locality Bit 2312
LRU UP, oldest CL entry on the LRU, zero=null 2314
LRU DOWN, next location a new CL will be placed, zero=null 2316
Current Counter Value WC installs total 2318
Current Counter Value WC installs with overlay 2320
Current Counter Value WC reads total 2322; and
Current Counter Value WC reads with full cache read hits 2324.

In accordance with features of the invention, with much of the cache management under hardware control, it would be difficult for firmware to help manage the per array cache thresholds (i.e. desired level of data in cache per array) and per array cache limits (i.e. maximum amount of data in cache per array) without assistance from the hardware. There are also overall (non-array) thresholds and limits to manage. The hardware provides inputs (registers) from firmware and outputs (registers and events) to firmware to help manage cache thresholds and limits.

In accordance with features of the invention, a new trigger based method is provided to dynamically optimize destage rate. The new trigger based method uses a set of registers for cache pages high and low trigger and cache CLs high and low trigger. Hardware maintains counters for each of these counts and when the hardware counters cross any of these high or low triggers, it generates an event for firmware to process. As these trigger values are crossed, and these events are processed, firmware then adjusts the destage queue depth accordingly. If the cache pages or cache CLs high water mark is crossed, the destage queue depth can be increased. At the same time, the values of the registers for the high and low cache pages and or cache CLs will be increased to detect the next crossing. If the cache pages or CLs low water mark is crossed, the destage rate may be lowered along with the setting of the high and low water marks. The destage rate will be determined by the higher of the cache pages or cache CLs. To avoid excess events, when either the cache pages or cache CLs crosses the high water mark, the high water mark for both will be moved up. However, it is only important to move the low water mark of the highest utilized resource. Essentially, the resource which is causing the higher destage rate is the only resource for which the low water mark must be monitored to detect when the destage rate can be lowered.

In accordance with features of the invention, when a cache pages or CLs low water mark is crossed, if it is the lower resource, the destage rate will not be changed and only the low water mark for that resource must be adjusted down. If it is the higher resource, the lower used resource level must be checked to determine if it has become the higher used resource. The destage rate will then be set based on the higher resource. Also, both of the high water marks are set based on the higher resource. Next, the low water mark for the higher resource must be set at the trigger point for the next lower destage rate. Finally, if the low water mark for the lower resource is at a higher point than the new setting for the higher resource, it must also be lowered.

In accordance with features of the invention, a per array trigger based method to dynamically adjust per resource limits. This uses a set of registers for per resource cache CLs high and low trigger, and per resource locality count high and low trigger. Hardware maintains counters for each of these counts and when the hardware counters cross any of these high or low triggers, it generates an event for firmware to process. Basically these triggers are used to monitor the ratio of CLs to locality count and adjust the per resource limit. If the CL count crosses the high water mark, then the limit should be decreased. At the same time, the high and low water mark for CLs should be increased. If the locality count crosses the high water mark, then the limit should be increased and the high and low water mark for the locality count should be increased. If the CL count crosses the low water mark, then the limit should be increased and the CLs high and low water marks should be decreased. If the locality count crosses the low water mark, then the limit should be decreased and the locality count high and low water marks should be decreased.

Figure 24:
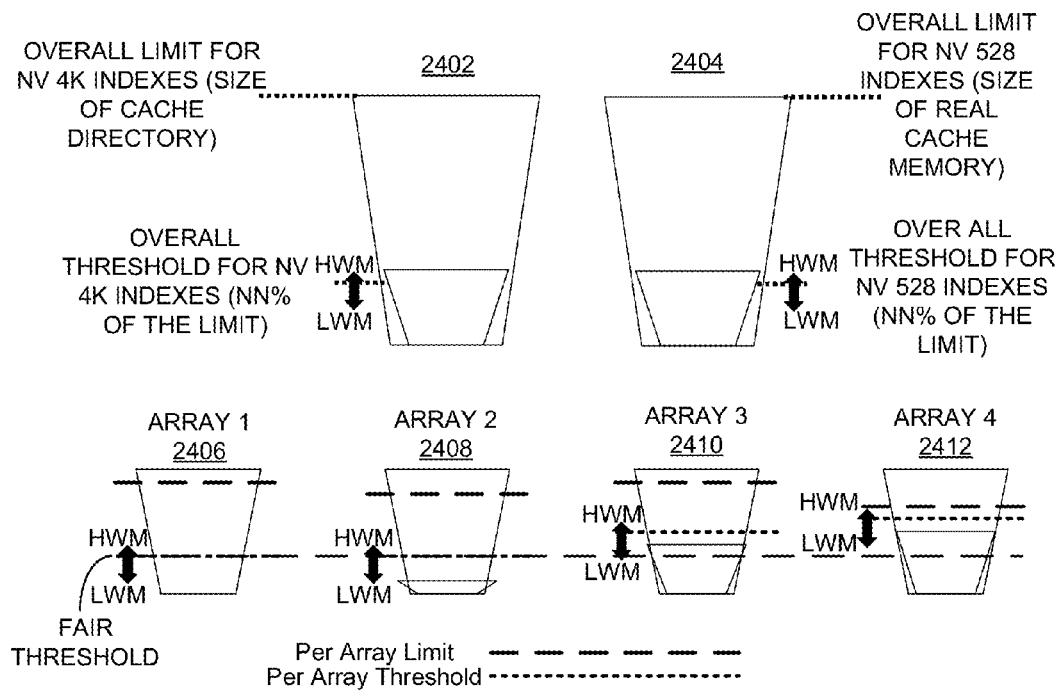
FIGS. 24 and 25 illustrate example CL limits and thresholds included with the controller for implementing storage adapter enhanced write cache management in accordance with the preferred embodiment.
Figure 25:
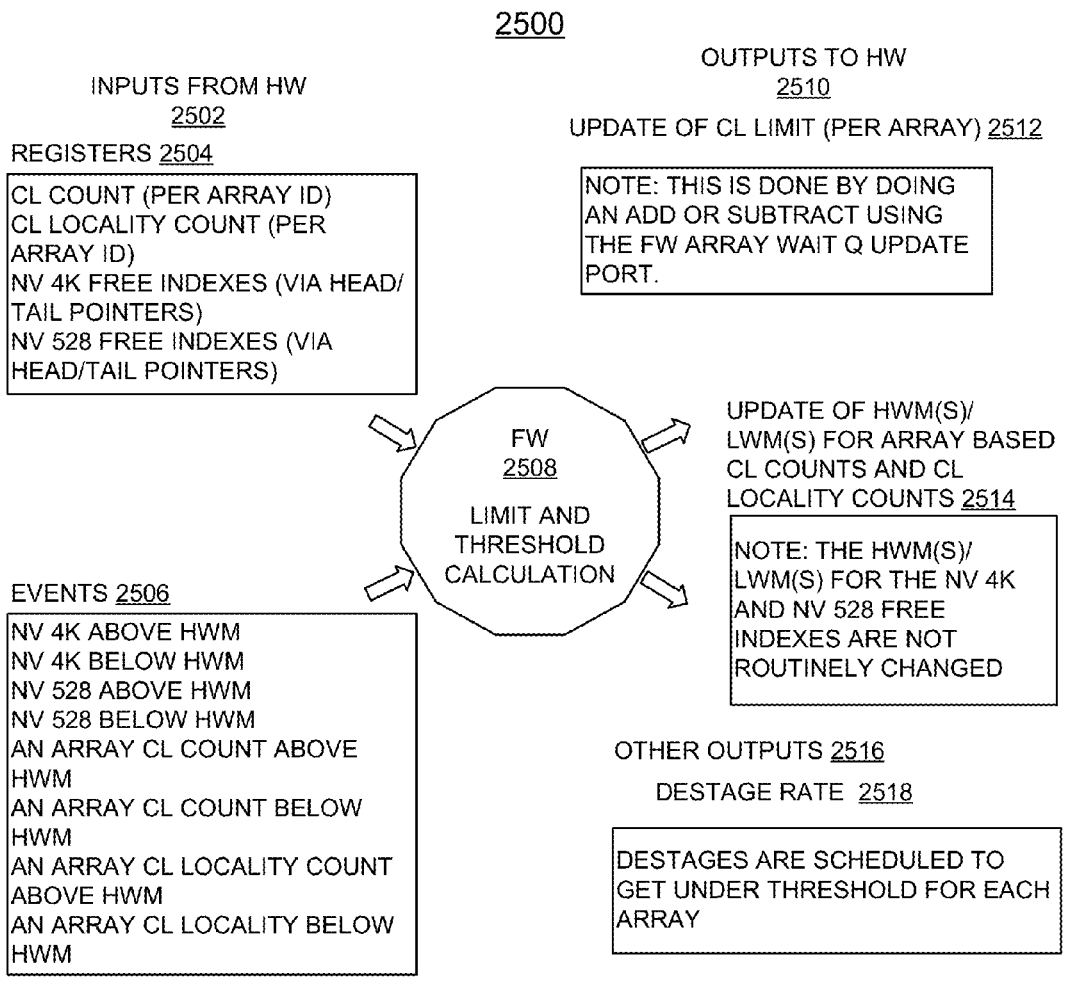

Referring now to FIGS. 24 and 25 illustrate example CL limits and thresholds respectively generally designated by the reference character 2400, 2500 included with the controller 102 for implementing storage adapter enhanced write cache management in accordance with the preferred embodiment.

In FIG. 24, CL limits and thresholds 2400 Overall Limit for NV 4K indexes (Size of cache directory) and Overall Threshold for NV 4K indexes (nn % of the limit) illustrated at 2402 and Overall Limit for NV 528 indexes (Size of real cache memory) and Overall Threshold for NV 528 indexes (nn % of the limit) illustrated at 2404 with example High Water Mark (HWM) and Low Water Mark (LWM). As shown at Array #1, 2406, Array #2, 2408, Array #3, 2410, and Array #4, 2412, respective example Per Array Limit is shown in dashed line and Per Array Threshold is shown in dotted line relative to HWM and LWM.

In FIG. 25, CL limits and thresholds 2500 include inputs from HW 2502 from Registers 2504 including
CL count (per array ID)
CL locality count (per array ID),
NV 4K free indexes (via head/tail pointers), and
NV 528 free indexes (via head/tail pointers). Inputs from HW 2502 from Events 2506 include:
NV 4K above HWM, NV 4K below LWM, NV 528 above HWM
NV 528 below LWM
An array CL count above HWM
An array CL count below LWM
An array CL locality count above HWM
An array CL locality count below LWM A FW Limit and Threshold Calculations function 2508 receives the Inputs from HW 2502 and provides Outputs to HW 2510 including update of CL limit (per array) 2512. This is done with an add or subtract using the FW Array Wait Q Update Port. Outputs to HW 2510 include Update of HWMs/LWMs for array based CL counts and CL locality counts 2514. Note that the HWMs/LWMs for the NV 4K and NV 528 free indexes are not routinely changed. Other outputs 2516 include Destage rate 2518.

Figure 26:
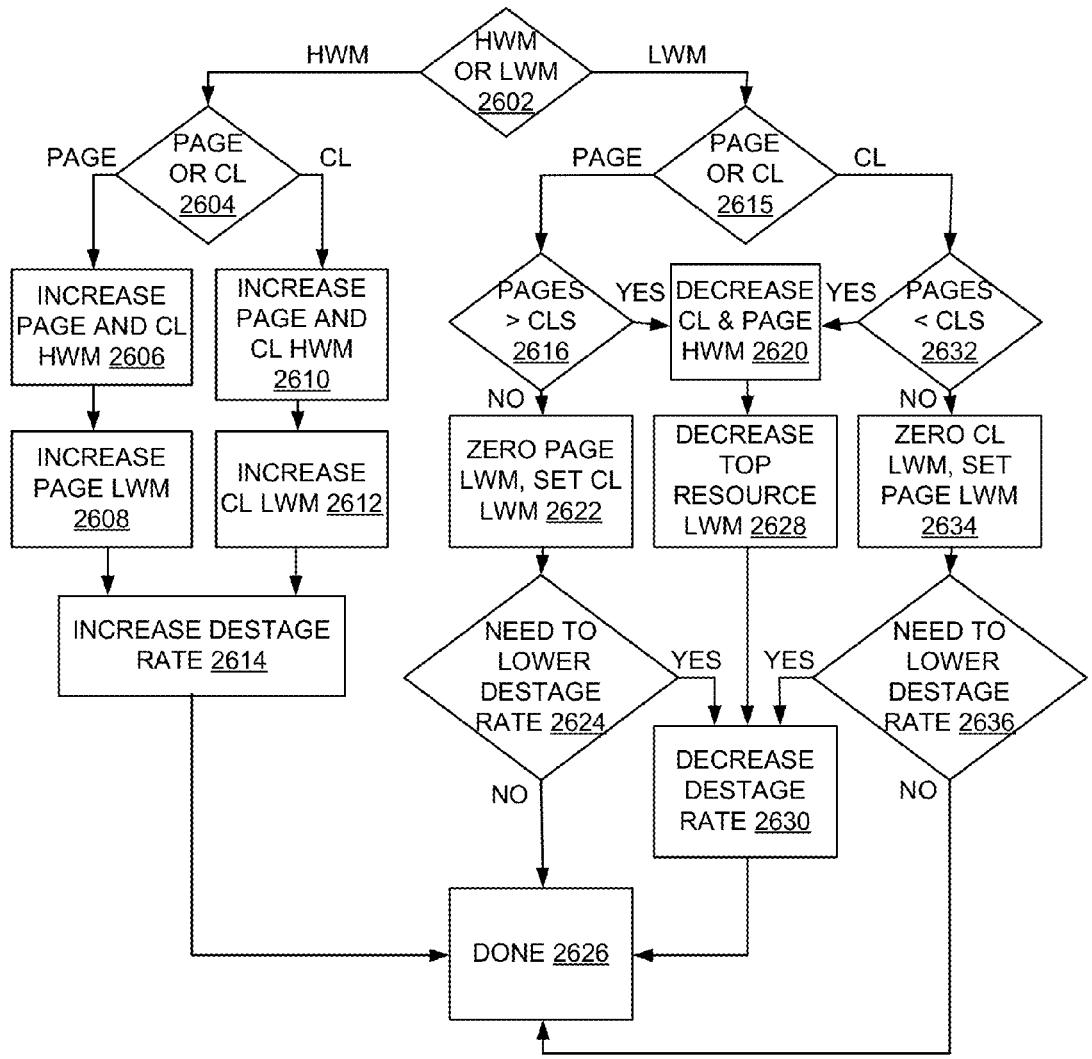
FIG. 26 is a flow chart illustrating example operations of global event processing included with the controller for implementing storage adapter enhanced write cache management in accordance with the preferred embodiment.

Referring now to FIG. 26 there is shown a flow chart illustrating example operations generally designated by the reference character 2600 of global event processing included with the controller 102 for implementing storage adapter enhanced write cache management in accordance with the preferred embodiment. As indicated at a decision block 2602, the HWM or LWM is identified. For the HWM, as indicated at a decision block 2604, a page or CL is identified. As indicated at a block 2606 the page and CL HWM are increased for the identified page. As indicated at a block

2608 the page LWM is increased. As indicated at a block 2610 the page and CL HWM are increased for the identified CL. As indicated at a block 2612 the CL LWM is increased. The destage rate is increased as indicated at a block 2614. For the LWM, as indicated at a decision block 2615, a page or CL is identified. As indicated at a block 2616, checking if the pages are greater than CLs is performed for the identified page. When pages are greater than CLs, the page and CL HWM are decreased as indicated at a block 2620. When pages are not greater than CLs, the page LWM is zeroed, and the CL LWM is set as indicated at a block 2622. Checking is performed to identify a need to lower the destage rate as indicated at a decision block 2624. When need to lower the destage rate is not identified, then the global event processing is done as indicated at a block 2626. A top resource LWM is decreased as indicated at a block 2628. The destage rate is decreased as indicated at a block 2630 and then the global event processing is done at block 2626. As indicated at a decision block 2632, checking if the pages are less than CLs is performed for the identified CL. When pages are less than CLs, the page and CL HWM are decreased at block 2620. When pages are not less than CLs, the CL LWM is zeroed, and the page LWM is set as indicated at a block 2634. Checking is performed to identify a need to lower the destage rate as indicated at a decision block 2636. When need to lower the destage rate is not identified, then the global event processing is done at block 2626. Then the destage rate is decreased as indicated at block 2630 and then the global event processing is done at block 2626.

Figure 27:
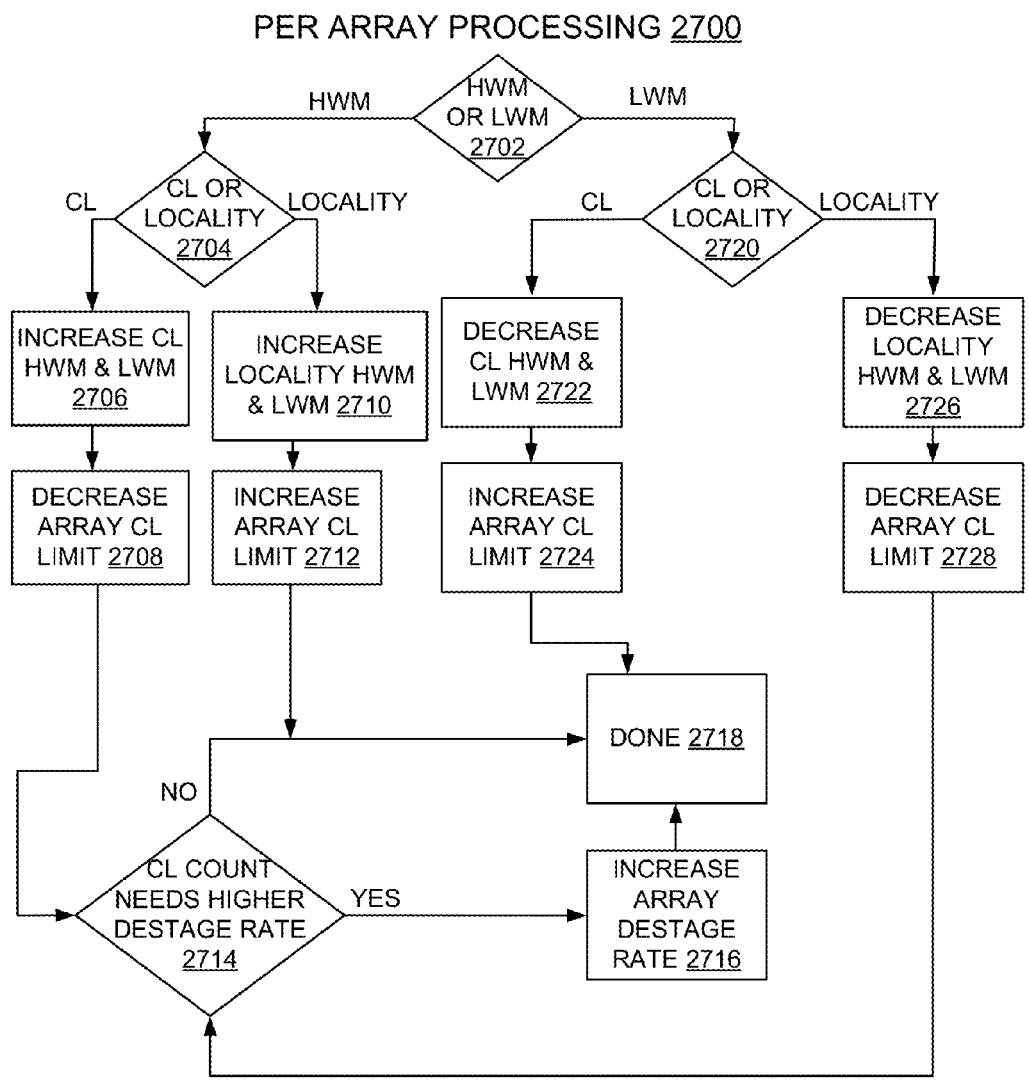
FIG. 27 is a flow chart illustrating example steps of per array processing included with the controller for implementing storage adapter enhanced write cache management in accordance with the preferred embodiment.

Referring now to FIG. 27 is a flow chart illustrating example steps generally designated by the reference character 2700 of per array processing included with the controller 102 for implementing storage adapter enhanced write cache management in accordance with the preferred embodiment. As indicated at a decision block 2702, the HWM or LWM is identified. For the HWM, as indicated at a decision block 2704, a locality or CL is identified. As indicated at a block 2706 the CL HWM and LWM are increased for the identified CL. As indicated at a block 2708, an Array CL Limit is decreased. As indicated at a block 2710 the Locality HWM and LWM are increased for the identified Locality. As indicated at a block 2712, an Array CL Limit is increased. Then as indicated at a decision block 2714, checking is performed to determine if the CL Count needs a higher Destage rate. If the CL Count needs a higher Destage rate, the array Destage rate is increased as indicated at a block 2716, and the per array processing ends as indicated at a block 2718. For the LWM, as indicated at a decision block 2720, a locality or CL is identified. As indicated at a block 2722 the CL HWM and LWM are decreased for the identified CL. As indicated at a block 2724, an Array CL Limit is increased. As indicated at a block 2726 the Locality HWM and LWM are decreased for the identified Locality. As indicated at a block 2728, an Array CL Limit is decreased. Then operation returns to decision block 2714, checking is performed to determine if the CL Count needs a higher Destage rate, and continues.

Figure 28:
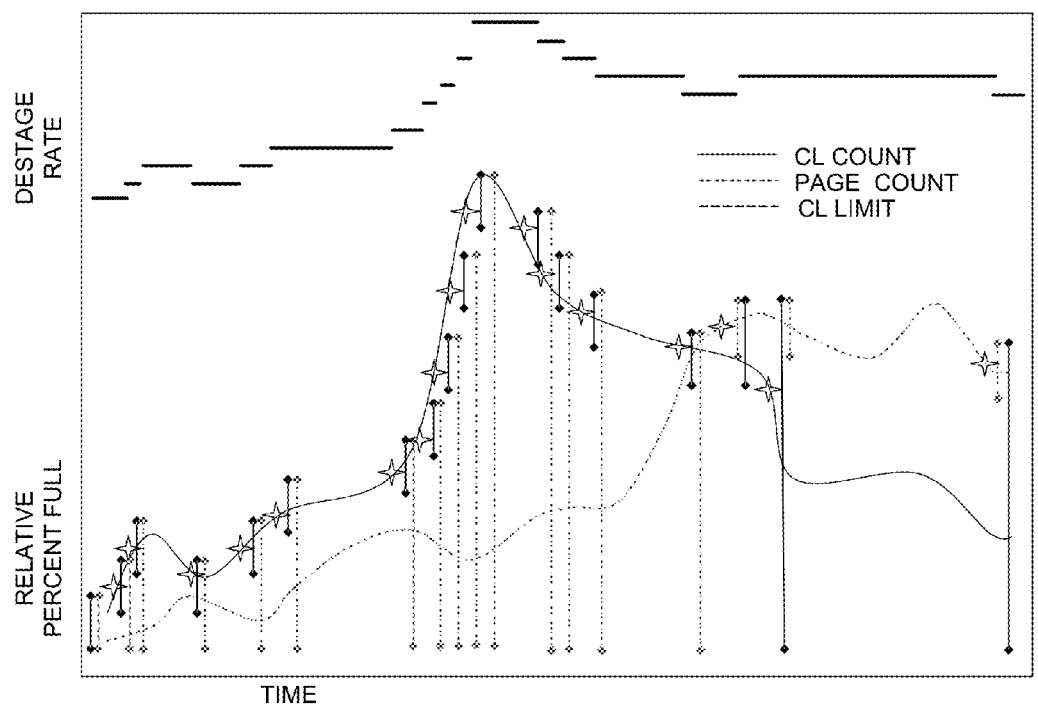
FIGS. 28 and 29 respectively illustrate example global triggers and per array triggers included with the controller for implementing storage adapter enhanced write cache management in accordance with the preferred embodiment.
Figure 29:
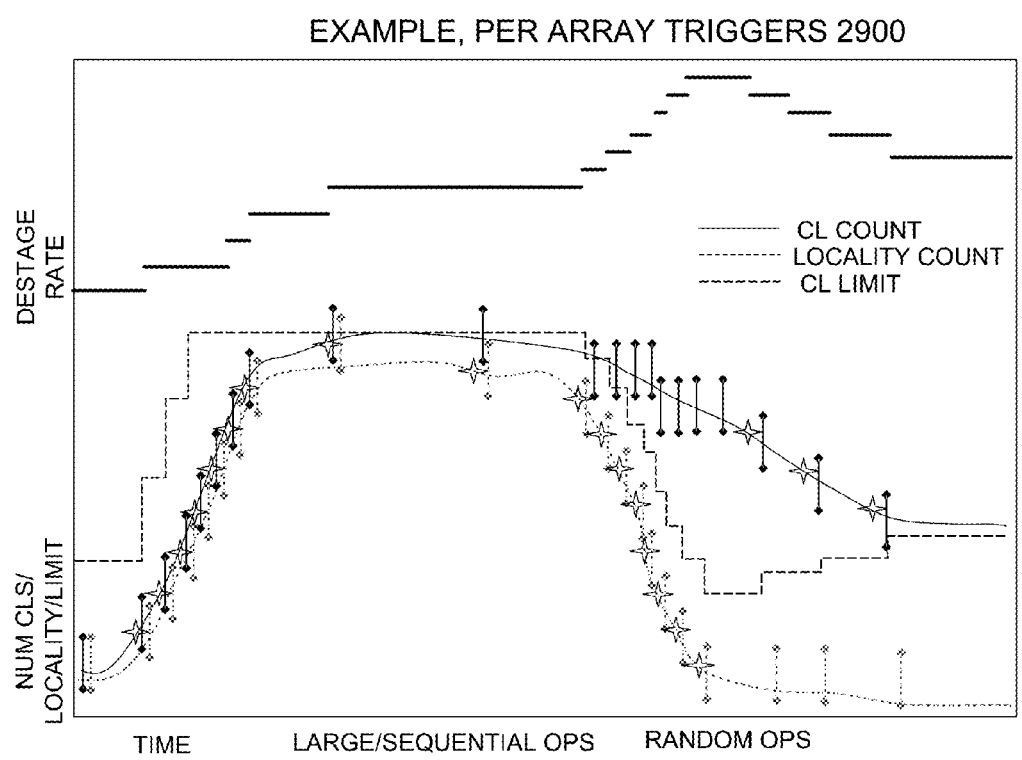

Referring now to FIGS. 28 and 29, there are shown respective example global triggers generally designated by the reference character 2800 and per array triggers generally designated by the reference character 2900 included with the controller 102 for implementing storage adapter enhanced write cache management in accordance with the preferred embodiment. In FIG. 28, global triggers 2800 include destage rate and relative percent full shown relative to the vertical axis, with time shown relative to the horizontal axis.

In FIG. 29, per array triggers 2900 include destage rate and number of CLs/Locality/Limit shown relative to the vertical axis, with time shown relative to the horizontal axis together with regions for large/sequential Ops, and random Ops. In FIG. 29, CL Count is illustrated with a solid line, Locality Count is illustrated with a dotted line, and CL Limit is illustrated with a dashed line, as shown.

Figure 30:
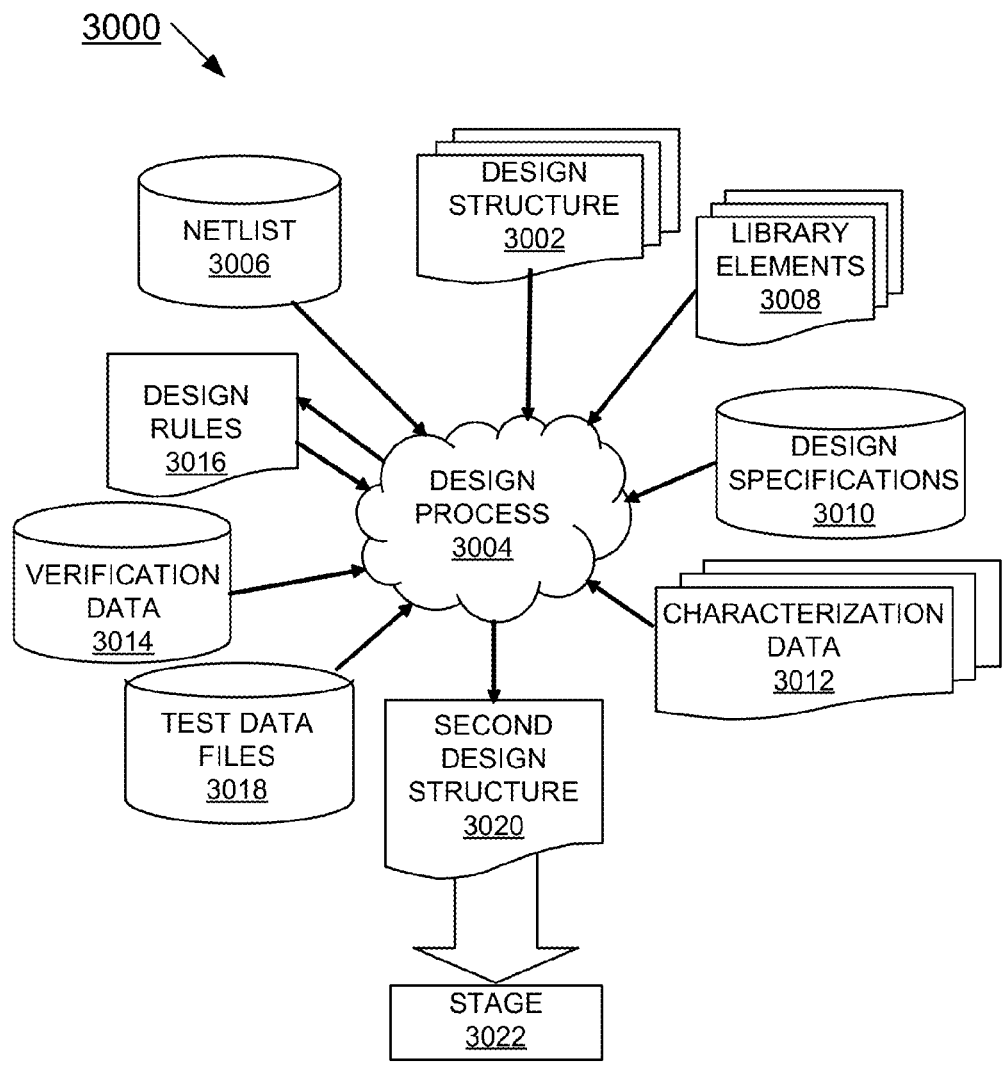
FIG. 30 is a flow diagram of a design process used in semiconductor design, manufacturing, and/or test.

FIG. 30 shows a block diagram of an example design flow 3000. Design flow 3000 may vary depending on the type of IC being designed. For example, a design flow 3000 for building an application specific IC (ASIC) may differ from a design flow 3000 for designing a standard component. Design structure 3002 is preferably an input to a design process 3004 and may come from an IP provider, a core developer, or other design company or may be generated by the operator of the design flow, or from other sources. Design structure 3002 comprises IOA or controller 102 in the form of schematics or HDL, a hardware-description language, for example, Verilog, VHDL, C, and the like. Design structure 3002 may be contained on one or more machine readable medium. For example, design structure 3002 may be a text file or a graphical representation of controller 102 and performance state machine 200. Design process 3004 preferably synthesizes, or translates, controller 102 into a netlist 3006, where netlist 3006 is, for example, a list of wires, transistors, logic gates, control circuits, I/O, models, etc. that describes the connections to other elements and circuits in an integrated circuit design and recorded on at least one of machine readable medium. This may be an iterative process in which netlist 3006 is resynthesized one or more times depending on design specifications and parameters for the circuit.

Design process 3004 may include using a variety of inputs; for example, inputs from library elements 3008 which may house a set of commonly used elements, circuits, and devices, including models, layouts, and symbolic representations, for a given manufacturing technology, such as different technology nodes, 32 nm, 45 nm, 90 nm, and the like, design specifications 3010, characterization data 3012, verification data 3014, design rules 3016, and test data files 3018, which may include test patterns and other testing information. Design process 3004 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 3004 preferably translates an embodiment of the invention as shown in FIGS. 1A, and 1B, along with any additional integrated circuit design or data (if applicable), into a second design structure 3020. Design structure 3020 resides on a storage medium in a data format used for the exchange of layout data of integrated circuits, for example, information stored in a GDSII (GDS2), GL1, OASIS, or any other suitable format for storing such design structures. Design structure 3020 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A, and 1B. Design structure 3020 may then proceed to a stage 3022 where, for example, design structure 3020 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
   a controller comprising a hardware write cache engine implementing storage adapter write cache management for a data storage write cache comprising:
   said data storage write cache including a plurality of structures of Cache Lines (CLs), a hash table, and per array of least recently used (LRU) queues;
   said hardware write cache engine implementing storage write cache hardware acceleration; and
   said hardware write cache engine managing write cache data and metadata substantially without using firmware including said hardware write cache engine performing hardware manipulation managing said plurality of structures of said CLs, said hash table, and said per array of least recently used (LRU) queues substantially without using firmware, and said hardware write cache engine providing substantially atomic update of a cache directory and providing substantially atomic updates of said CLs, said hash table, and said per array of least recently used (LRU) queues with said structures being unmodified or completely updated each time said hardware write cache engine executes.

2. The data storage system as recited in claim 1 includes said hardware write cache engine performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues on an Array ID or an Array LBA (Logical Block Address) basis.

3. The data storage system as recited in claim 1 includes said hardware write cache engine mirroring cache data and directory from a control store (CS) memory to a data store (DS) memory including at least one of local mirroring in said controller and remote mirroring to a dual controller.

4. The data storage system as recited in claim 1 wherein said hardware write cache engine performing hardware manipulation managing said plurality of structures of CLs, said hash table, and said per array least recently used (LRU) queues includes tracking CL states including Mirror In Progress (MIP) during a write operation while mirroring data and directory to local and remote DS memory.

5. The data storage system as recited in claim 1 wherein said hardware write cache engine performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues includes tracking CL states including Read In Progress (RIP), during a read operation.

6. The data storage system as recited in claim 1 wherein said hardware write cache engine performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues includes tracking CL states including Destage In Progress (DIP), during a destage operation.

7. The data storage system as recited in claim 1 includes said hardware write cache engine uses an Op Build Number or sequence number within a (CL) to enable guaranteed correct identification of older vs. newer data in said storage write cache for an array logical block address (LBA).

8. The data storage system as recited in claim 1 includes said hardware write cache engine implementing a set of policies which allow for a read operation and a cache destage operation to occur simultaneously for the same CLs.

9. A method for implementing storage adapter write cache management in a data storage system comprising:
   providing a storage write cache including a plurality of structures of Cache Lines (CLs), a hash table, and per array of least recently used (LRU) queues;
   providing a controller comprising a hardware write cache engine managing said storage write cache;
   providing said hardware write cache engine for implementing storage write cache hardware acceleration; and
   providing said hardware write cache engine managing write cache data and metadata substantially without using firmware including providing said hardware write cache engine for performing hardware manipulation managing said plurality of structures of said CLs, said hash table, and said per array of least recently used (LRU) queues substantially without using firmware, and said hardware write cache engine providing substantially atomic update of a cache directory and providing substantially atomic updates of said CLs, said hash table, and said per array least recently used (LRU) queues with said structures being unmodified or completely updated each time said hardware write cache engine executes.

10. The method as recited in claim 9 includes providing said hardware write cache engine for performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues on an Array ID or an Array LBA (Logical Block Address) basis.

11. The method as recited in claim 9 wherein providing said hardware write cache engine for performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues includes tracking CL states including Mirror In Progress (MIP) during a write operation, said hardware write cache engine mirroring cache data and directory from a control store (CS) memory to a data store (DS) memory including at least one of local mirroring in said controller and remote mirroring to a dual controller.

12. The method as recited in claim 9 wherein providing said hardware write cache engine for performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues includes tracking CL states including Read In Progress (RIP), during a read operation.

13. The method as recited in claim 9 wherein providing said hardware write cache engine for performing hardware manipulation managing said plurality of structures of said CLs, said hash table, and said per array of least recently used (LRU) queues substantially without using firmware and providing substantially atomic updates of said CLs, said hash table, and said per array least recently used (LRU) queues includes tracking CL states including Destage In Progress (DIP), during a destage operation.

14. The method as recited in claim 9 includes said hardware write cache engine implementing a set of policies which allow for a read operation and a cache destage operation to occur simultaneously for the same CLs.

15. The method as recited in claim 9 includes said hardware write cache engine using an Op Build Number or sequence number within a (CL) to enable guaranteed correct identification of older vs. newer data in said storage write cache for an array logical block address (LBA).

* * * * *